(12) United States Patent
Shiina et al.

(10) Patent No.: US 7,575,090 B2
(45) Date of Patent: Aug. 18, 2009

(54) ELECTRIC POWER STEERING DEVICE

(75) Inventors: Akihiko Shiina, Osaka (JP); Hiroaki Shinto, Osaka (JP); Mitsuharu Minami, Osaka (JP); Noritake Okawa, Osaka (JP); Masayoshi Sakuda, Osaka (JP)

(73) Assignee: JTEKT Corporation, Osaka (JP)

( * ) Notice: Subject to any disclaimer, the term of this patent is extended or adjusted under 35 U.S.C. 154(b) by 345 days.

(21) Appl. No.: 10/553,815

(22) PCT Filed: Apr. 16, 2004

(86) PCT No.: PCT/JP2004/005522
§ 371 (c)(1),
(2), (4) Date: Feb. 21, 2006

(87) PCT Pub. No.: WO2004/091997
PCT Pub. Date: Oct. 28, 2004

(65) Prior Publication Data
US 2007/0102228 A1 May 10, 2007

(30) Foreign Application Priority Data

| Apr. 18, 2003 | (JP) | ............................. 2003-114018 |
| Apr. 18, 2003 | (JP) | ............................. 2003-114020 |
| Apr. 23, 2003 | (JP) | ............................. 2003-118167 |
| Apr. 23, 2003 | (JP) | ............................. 2003-118168 |

(51) Int. Cl.
*B62D 5/04* (2006.01)
(52) U.S. Cl. ..................................... 180/443; 180/444
(58) Field of Classification Search ................. 180/444, 180/443
See application file for complete search history.

(56) References Cited

U.S. PATENT DOCUMENTS

| 2,317,490 A | * | 4/1943 | Simpson ...................... 74/427 |
| 5,605,071 A | * | 2/1997 | Buchanan, Jr. ............... 74/425 |

(Continued)

FOREIGN PATENT DOCUMENTS

DE          19603270 A       7/1997

(Continued)

OTHER PUBLICATIONS

International Search Report for PCT/JP2004/005522 mailed on Aug. 17, 2004.

(Continued)

*Primary Examiner*—Lesley D Morris
*Assistant Examiner*—Michael R Stabley
(74) *Attorney, Agent, or Firm*—Darby & Darby P.C.

(57) ABSTRACT

An electric power steering device provided with two belleville springs for suppressing the axial movement of a worm rotated by a steering-assisting electric motor and having shaft portions at its both end portions, and limiting members for limiting the deflection amounts of the two belleville springs. The limiting members are respectively disposed at portions along the outer circumferences of the shaft portions at both end portions of the worm, the respective inner circumferential portions of the two belleville springs are formed into flat portions, the outer circumferential portions thereof are respectively formed into tapered portions having a taper shape, and the limiting members are made contact with the flat portions, thereby limiting the deflection amounts of the tapered portions. Hence, the limiting members can be provided without increasing the size of the worm serving as a small gear.

5 Claims, 15 Drawing Sheets

U.S. PATENT DOCUMENTS

| | | | | |
|---|---|---|---|---|
| 6,044,723 A * | 4/2000 | Eda et al. | ................ | 74/388 PS |
| 6,520,042 B2 * | 2/2003 | Jammer et al. | ................ | 74/425 |
| 6,708,796 B2 * | 3/2004 | Kinme et al. | ............... | 180/444 |
| 7,177,744 B2 * | 2/2007 | Tanaka et al. | ................ | 701/41 |
| 2001/0040067 A1 * | 11/2001 | Murakami et al. | .......... | 180/444 |
| 2002/0053249 A1 * | 5/2002 | Jammer et al. | ................ | 74/425 |

FOREIGN PATENT DOCUMENTS

| | | |
|---|---|---|
| EP | 0943842 A | 9/1999 |
| EP | 943842 A1 * | 9/1999 |
| EP | 1106474 A | 6/2001 |
| EP | 1447305 A | 8/2004 |
| EP | 1452419 A | 9/2004 |
| JP | 63012103 | 1/1988 |
| JP | 07156811 | 6/1995 |
| JP | 11-043062 A | 2/1999 |
| JP | 2001165246 | 6/2001 |
| JP | 2001-354145 A | 12/2001 |
| JP | 2001-354148 A | 12/2001 |
| JP | 2002-021943 A | 1/2002 |
| JP | 2002-067992 A | 3/2002 |
| JP | 2002-127918 A | 5/2002 |
| JP | 2002-145082 A | 5/2002 |
| JP | 2003-511295 A | 3/2003 |
| JP | 2004243947 | 9/2004 |
| WO | 9427057 | 11/1994 |

OTHER PUBLICATIONS esp@cenet document view: Abstract for WO0125073 published on Apr. 12, 2001.

esp@cenet document view: Abstract for EP1222104 published on Jul. 17, 2002.

* cited by examiner

US 7,575,090 B2

ELECTRIC POWER STEERING DEVICE

CROSS REFERENCE TO PRIOR APPLICATION

This is a U.S. National Phase application under 35 U.S.C. §371 of International Patent Application No. PCT/JP2004/005522 filed on Apr. 16, 2004. The International Application was published in Japanese on Oct. 28, 2004 as WO 2004/091997 A1 under PCT Article 21(2). The International Patent Application claims priority to Japanese Patent Application Nos. 2003-114020, 2003-114018, 2003-118168, and 2003-118167. The disclosure of priority applications is incorporated by references.

BACKGROUND OF THE INVENTION

1. Field of the Invention

The present invention relates to an electric power steering device that uses an electric motor as a source for generating a steering assistance force.

2. Description of Related Art

As electric power steering devices for vehicles, a device having the configuration disclosed in Japanese Patent Application Laid-Open No. 2002-21943, for example, is general. This electric power steering device is configured to detect the steering torque applied to the input shaft depending on the relative angular displacement amount between the input shaft connected to the steering wheel and the output shaft coaxially connected to the input shaft via a torsion bar and to drive a steering-assisting electric motor on the basis of the detected torque. In this kind of electric power steering device, the rotation force of the electric motor is transmitted to a steering mechanism via a reduction gear mechanism, and the operation of the steering mechanism depending on the rotation of the steering wheel is assisted, whereby the driver's load for steering is reduced.

The reduction gear mechanism comprises a worm serving as a small gear and connected to the driving shaft of the electric motor and a worm gear serving as a large gear and meshing with the worm, and this worm wheel is fitted on and secured to the intermediate portion of the output shaft.

In addition, the worm has shaft portions protruding from both end portions of the tooth portion (gear body) thereof, and the shaft portions are rotatably inserted into the inner rings of roller bearings so as to be born, respectively.

Conventionally, the worm of the electric power steering device configured as described above is born so that the shaft portions at both end portions cannot move in the axial direction with respect to the roller bearings being used respectively to bear the shaft portions. Hence, in the case where the device is configured that, when the steering wheel is steered left or right from the steering neutral position, steering assistance is carried out by the rotation of the electric motor in the early stage of the start of the steering, the steering assistance is carried out even if the steering angle of a vehicle running at high speed is a small angle of approximately one degree, for example; hence, steering feeling is deteriorated. Hence, conventional electric power steering devices are generally configured that the electric motor is not driven when the steering angle is a small angle of approximately one degree, and that the electric motor is driven only when the steering angle exceeds an appropriate steering angle.

In the conventional electric power steering devices configured that the electric motor is not driven until the steering angle exceeds the appropriate steering angle as described above, when the steering is in a range wherein the electric motor is not driven, in other words, when the steering is performed in the vicinity of the steering neutral position, the steering force of the steering wheel is transmitted to the driving shaft of the electric motor via the input shaft, the torsion bar, the output shaft, the worm wheel and the worm, whereby the driving shaft is rotated. As a result, the load for rotating the driving shaft of the electric motor is applied reversely to the steering wheel via the worm, the worm wheel, the output shaft, the torsion bar and the input shaft; hence, the steering load becomes large and steering feeling is deteriorated.

For the purpose of reducing the steering load in a steering range wherein the electric motor is not driven, a technology is known which is disclosed in Japanese Patent Application Laid-Open No. 11-43062 (1999), for example. This electric power steering device is configured that the worm connected to the driving shaft of the electric motor is born by two roller bearings spaced in the axial direction of the worm so as to be movable in the axial direction.

However, in this conventional electric power steering device, belleville springs are respectively provided between the inner rings of the two roller bearings and the worm, and the movement of the worm, both ways in the axial direction, is suppressed by the elastic restoration forces of the two belleville springs.

In such kind of conventional electric power steering device, in the case where the steering force of the steering wheel is transmitted from the worm wheel to the worm while the steering is performed in a range wherein the electric motor is not driven, the worm is moved in the axial direction by the component force applied to the worm in the axial direction, against the elastic restoration force of the belleville spring. Hence, the rotational angle of the worm becomes small, and the transmission from the worm to the driving shaft of the electric motor is relieved.

However, in the configuration of the electric power steering device disclosed in Japanese Patent Application Laid-Open No. 11-43062 (1999) described above, in the case where the force applied to the worm in the axial direction is relatively large while the steering is performed in the range wherein the electric motor is not driven, the forces applied to the belleville springs may exceed the deflection limits thereof. In such a case, the belleville springs may undergo plastic deformation and become nonfunctional, or the lowering of the durability thereof may be caused.

For the purpose of preventing the plastic deformation of the belleville springs or the lowering of the durability thereof described above, it is conceivable that limiting members for limiting the deflection amounts of the belleville springs are provided between the inner rings of the roller bearings and the worm. By the provision of such limiting members, before the deflection limits of the belleville springs are exceeded, the limiting members make contact with the inner rings or the worm and prevent the belleville springs from deflecting further, thereby limiting the deflection amounts of the belleville springs.

However, the belleville springs are wholly formed into a taper shape from the inner fringe to the outer fringe so as to have flexibility. Hence, in the case where the above-mentioned limiting members are provided, each limiting member is disposed inside the inner fringe or outside the outer fringe of the belleville spring. In the case where the limiting member is disposed inside the inner fringe of the belleville spring, it is necessary to increase the diameter of the belleville spring so that the limiting member can pass through the inside of the inner fringe of the belleville spring. On the other hand, in the case where the limiting member is disposed outside the outer fringe of the belleville spring, it is necessary to increase the diameter of the worm or the size of the housing incorporating the worm so that the limiting member can be disposed. Hence, in the case where the limiting members for the belleville springs are provided, it is inevitable that the size of the worm portion is increased in comparison with the case where the limiting members for the belleville springs are not provided.

Furthermore, Japanese Patent Application Laid-Open No. 11-43062 (1999) described above discloses a configuration wherein O rings are provided on the inner circumferential sides of the inner rings and on the outer circumferential sides of the outer rings of the roller bearings for bearing the worm. With such kind of configuration, the meshing noise at the meshing portion can be reduced by using the flexibility of the O rings owing to the meshing reaction forces applied to the meshing portion of the worm and the worm wheel. However, this kind of configuration causes a problem of increasing the backlash amount at the meshing portion owing to the abrasion of the teeth of the worm and the worm wheel.

Moreover, since the belleville springs are formed into a taper shape from the inner fringe to the outer fringe as described above, if the belleville spring is assembled in such a way that the direction of the taper is reversed, the function of the belleville spring is lowered or the belleville spring does not function at all. In such a case, it becomes necessary to reassemble the belleville spring.

Still further, the difference in the dimensions of the inner fringe and the outer fringe of the belleville spring is relatively large; hence, this also causes the problem of inevitably increasing the size of the worm portion.

BRIEF SUMMARY OF THE INVENTION

In view of the above-mentioned circumstances, it is a main object of the present invention to provide an electric power steering device capable of being provided with limiting members for limiting the deflection amounts of circular elastic bodies (for example, belleville springs) without increasing the size of a small gear portion (for example, a worm).

Furthermore, in addition to the above-mentioned object, it is another object of the present invention to provide an electric power steering device capable of raising the durability of elastic bodies for reducing the steering load in a steering range wherein a steering-assisting electric motor is not driven and also capable of not increasing the backlash amount at the meshing portion of gears even in the case where the abrasion amounts of the teeth of the gears increase.

Moreover, in addition to the above-mentioned objects, it is still another object of the present invention to provide an electric power steering device capable of preventing the plastic deformation of elastic bodies for reducing the steering load in a steering range wherein a steering-assisting electric motor is not driven, capable of raising the durability thereof, and capable of eliminating the necessity of reassembling the elastic bodies.

Besides, in addition to the above-mentioned objects, it is a yet still another object of the present invention to provide an electric power steering device capable of raising the durability of elastic bodies for reducing the steering load in a steering range wherein a steering-assisting electric motor is not driven, capable of eliminating the necessity of reassembling the elastic bodies, and capable of being provided with the elastic bodies without increasing the size of a small gear portion.

Still further, it is a further object of the present invention to provide an electric power steering device capable of raising the durability of elastic bodies without increasing the number of components.

A first invention of the electric power steering device in accordance with the present invention comprises: a small gear having a gear body which is rotated by an electric motor and on which a tooth portion is formed and shaft portions respectively formed so as to protrude from both end portions of said gear body and being smaller in diameter than said gear body; bearings for respectively bearing both said shaft portions of said small gear so that said small gear can move in an axial direction; two circular elastic bodies, respectively externally fitted on both said shaft portions of said small gear, for suppressing movement of said small gear in the axial direction to shaft end portions; and a large gear meshing with the tooth portion of said gear body of said small gear and connected to a steering means; and being configured to assist steering by rotation of said electric motor, and is characterized by comprising: limiting members, provided at portions along outer circumferences of said shaft portions respectively at its both end portions of said gear body, for limiting deflection amounts of said elastic bodies.

In the first invention of the electric power steering device in accordance with the present invention described above, the limiting members for limiting the deflection amounts of the circular elastic bodies can be provided at portions along the outer circumferences of the shaft portions respectively at both end portions of the gear body without increasing the size of the small gear portion.

A second invention of the electric power steering device in accordance with the present invention is characterized that, in accordance with the first invention, said circular elastic body has flat portions formed on inner circumferential side, and a tapered portion formed on outer circumferential side and connected to said flat portions.

In the second invention of the electric power steering device in accordance with the present invention described above, in the case where the circular elastic bodies are deflected by forces applied to the small gear in the axial direction, the deflection amounts of the circular elastic bodies are limited by the limiting members; hence, the plastic deformation of the circular elastic bodies can be prevented or the durability thereof can be improved. Furthermore, the flat portions being formed flat are provided on the inner circumferential side of the circular elastic body, and these flat portions make contact with the limiting member, and the deflection amount of the tapered portion is limited; hence, the limiting members can be provided without increasing the size of the small gear portion.

A third invention of the electric power steering device in accordance with the present invention is characterized that, in accordance with the second invention, said bearings are roller bearings, said circular elastic body is a belleville spring having said flat portions at its end portions and multiple flexible pieces formed so as to protrude from said tapered portion to the inner circumferential side, said limiting members are disposed between inner rings of said roller bearings and its both end portions of said gear body of said small gear, respectively, and said inner rings of said roller bearings are configured so as to make contact with protruding side faces of said flat portions, and said limiting members are configured so as to make contact with rear faces of said protruding side faces.

In the third invention of the electric power steering device in accordance with the present invention described above, the flat portions of the circular elastic body can be used as seats for the inner ring, and the flat portions can be made face contact with one side face of the inner ring. Hence, since the belleville springs do not require support members for supporting the flexible pieces, the stability of the belleville springs can be raised. Therefore, the number of components can be reduced although the belleville springs are provided, and the cost can be reduced in comparison with the case wherein supporting members for suppressing the flexible pieces are used.

Furthermore, even in the case where the belleville springs are rotated in the circumferential direction owing to vibration or the like applied to the small gear, since the limiting members make contact with the flat portions of the circular elastic bodies, positioning means for fixing the circumferential positions of the belleville springs are not necessary. Hence, the number of man-hours required for working and the number of man-hours required for assembly can be reduced in comparison with the case wherein the above-mentioned positioning means are provided, and the cost can be further reduced.

A fourth invention of the electric power steering device in accordance with the present invention is characterized that, in accordance with the first invention, said bearings are configured so as to be movable in a direction wherein a distance between a rotational center of said small gear and a rotational center of said large gear becomes long or short, and an energizing means for energizing said bearings in a direction wherein the distance between the rotational center of said small gear and the rotational center of said large gear becomes short is provided.

In the fourth invention of the electric power steering device in accordance with the present invention described above, in the case where steering is performed left or right from the steering neutral position, the elastic bodies are deflected by forces applied to the small gear in the axial direction. As a result, the steering load in the steering range wherein the electric motor is not driven can be reduced, and steering feeling is improved. Furthermore, in the case where the elastic bodies are deflected by forces applied to the small gear in the axial direction, since the deflection amounts of the elastic bodies are limited by the limiting members, the durability of the elastic bodies is improved.

Still further, since the small gear is energized via the bearings in the direction wherein the distance between the rotational centers of the small gear and the large gear becomes short, meshing noise owing to meshing reaction forces applied to the meshing portion can be reduced; furthermore, even in the case where the teeth of the small gear and the large gear are worn, the backlash amount at the meshing portion is reduced.

A fifth invention of the electric power steering device in accordance with the present invention is characterized that, in accordance with the fourth invention, said bearings are roller bearings, and said circular elastic bodies are belleville springs disposed between inner rings of said roller bearings and end portions of said gear body of said small gear.

In the fifth invention of the electric power steering device in accordance with the present invention described above, the step portions at both end portions of the gear body can be used as seats for receiving the elastic bodies; hence, the structure for supporting the elastic bodies can be simplified, and the machinability and assembly workability are improved.

A sixth invention of the electric power steering device in accordance with the present invention is characterized that, in accordance with the first invention, said bearings are roller bearings, and said circular elastic bodies are installed in inner rings of said roller bearing.

In the fifth invention of the electric power steering device in accordance with the present invention described above, in the case where steering is performed left or right from the steering neutral position, the elastic bodies are deflected by forces applied to the small gear in the axial direction. As a result, the steering load in the steering range wherein the electric motor is not driven can be reduced, and steering feeling is improved. Furthermore, in the case where the elastic bodies are deflected by forces applied to the small gear in the axial direction, since the deflection amounts of the elastic bodies are limited by the limiting members, the durability of the elastic bodies is improved.

Still further, since the elastic bodies are assembled in the inner rings of the roller bearings, it is not necessary to assemble the elastic bodies individually. Therefore, the possibility of causing improper assembly of the elastic bodies during manufacturing is eliminated; hence, it is not necessary to reassemble the elastic bodies, and the assembly workability is improved.

A seventh invention of the electric power steering device in accordance with the present invention is characterized that, in accordance with the sixth invention, circular grooves are formed on outer circumferential faces of said inner rings of said roller bearings between raceway grooves and side faces on sides of said gear body of said small gear, and said circular elastic bodies are belleville springs whose inner circumferential portions are formed so as to be fitted in said circular grooves formed on the outer circumferential faces of said inner rings of said roller bearings.

In the seventh invention of the electric power steering device in accordance with the present invention described above, since the belleville springs can be assembled beforehand in the roller bearings by externally fitting the fitting inner circumferential portions of the belleville springs in the circular grooves, the belleville springs can be installed easily during manufacturing. Furthermore, since the spaces between the inner rings and the outer rings of the roller bearings are used as the deflection ranges of the belleville springs, the axial length of the small gear portion can be shortened without suppressing the maximum deflection amounts of the belleville springs.

An eighth invention of the electric power steering device in accordance with the present invention is characterized that, in accordance with the first invention, said circular elastic bodies are belleville springs whose outer circumferential portions are formed so as to be fitted in circular grooves formed on inner circumferential faces of cylindrical concave portions formed at end portions of said small gear.

In the eighth invention of the electric power steering device in accordance with the present invention described above, since the circular elastic bodies are assembled in the step portions of the small gear, it is not necessary to assemble the elastic bodies individually. Hence, the possibility of causing a mistake of assembling the elastic bodies in the reverse direction during manufacturing is eliminated; hence, it is possible to eliminate the necessity of reassembling the elastic bodies, and the assembly workability is improved.

A ninth invention of the electric power steering device in accordance with the present invention is characterized that, in accordance with the first invention, said circular elastic bodies are cylindrical elastic bodies externally fitted over portions of said shaft portions of said small gear between inner rings of said roller bearings and end portions of said gear body of said small gear, and said limiting members are provided at portions of end portions of said small gear inside said cylindrical elastic bodies.

In the ninth invention of the electric power steering device in accordance with the present invention described above, in the case where the cylindrical elastic bodies are deflected by forces applied to the small gear in the axial direction, the deflection amounts of the cylindrical elastic bodies are limited by the limiting member; hence, the plastic deformation of the cylindrical elastic bodies is prevented, and the durability thereof is improved.

Furthermore, since the cylindrical elastic bodies are wholly cylindrical, unlike the case of the belleville springs, the possibility of causing a mistake of assembling the elastic bodies in the reverse direction is eliminated; hence, the necessity of reassembling the cylindrical elastic bodies is eliminated. Still further, the differences in the dimensions of the inside and outside diameters of the cylindrical elastic bodies are small in comparison with the belleville springs. Therefore, such spring receiving members as those required for the belleville springs are not necessary for the cylindrical elastic bodies; hence, the number of components can be reduced, and the cylindrical elastic bodies can be assembled without increasing the size of the small gear portion.

A tenth invention of the electric power steering device in accordance with the present invention is characterized that, in accordance with the ninth invention, said cylindrical elastic bodies are coil springs, and said limiting members are convex members provided so as to be integrated with the end portions of said small gear.

In the tenth invention of the electric power steering device in accordance with the present invention described above, since the elastic restoration forces of the cylindrical elastic bodies in the deflection ranges become stable, steering feeling is further improved. Furthermore, since the convex portions provided so as to be integrated with the shaft portions of the small gear are used to function as limiting members, it is possible to provide limiting members without increasing the number of components; hence, the assembly workability is improved, and the cost is reduced although the limiting members are provided.

The above and further objects and features of the invention will more fully be apparent from the following detailed description with accompanying drawings.

DETAILED DESCRIPTION OF THE PRESENT INVENTION

The present invention will be described below on the basis of the drawings showing embodiments thereof.

Embodiment 1

Figure 1:
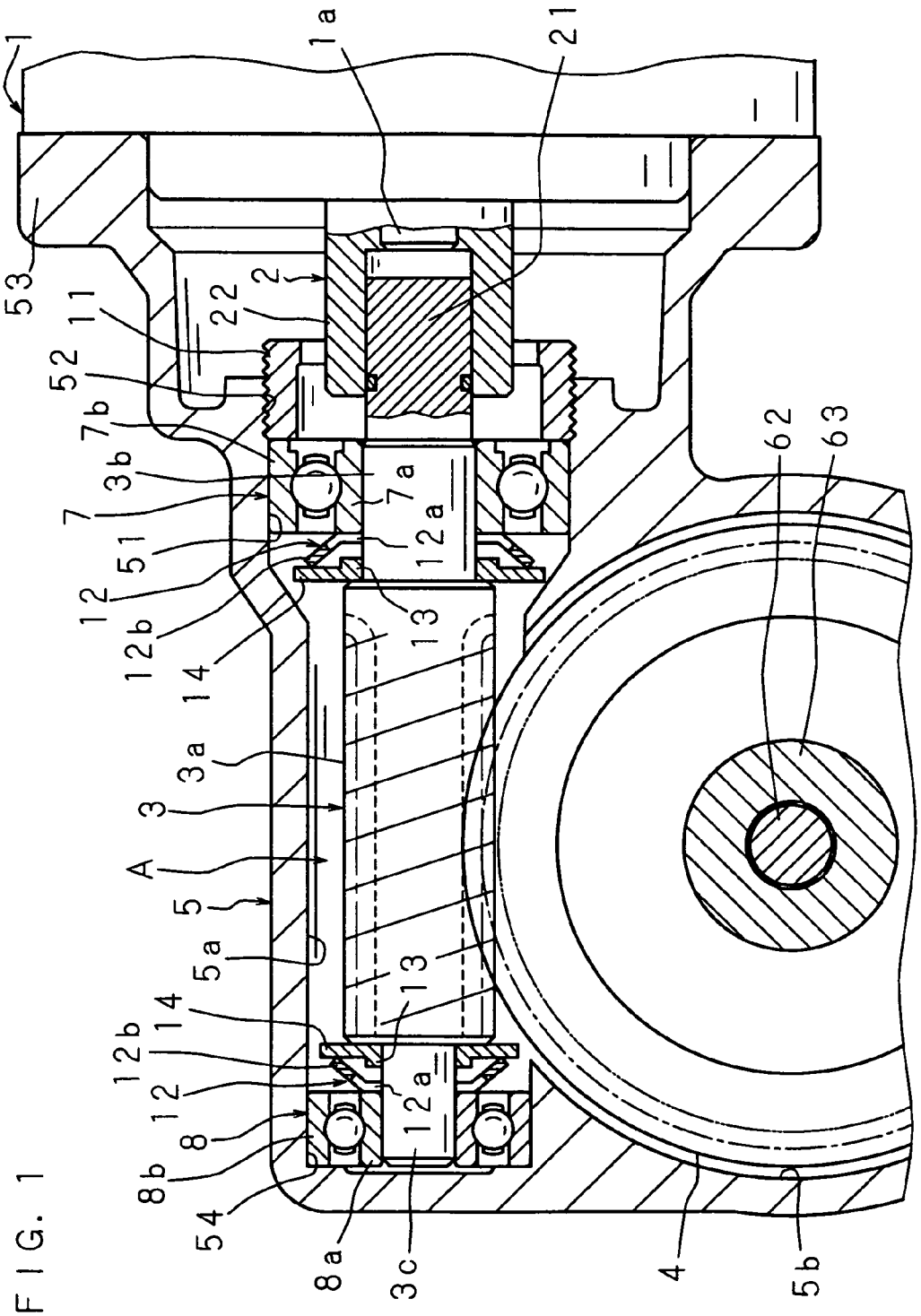
FIG. 1 is a schematic enlarged sectional view of a reduction gear mechanism portion, showing the configuration of Embodiment 1 of an electric power steering device in accordance with the present invention.
Figure 2:
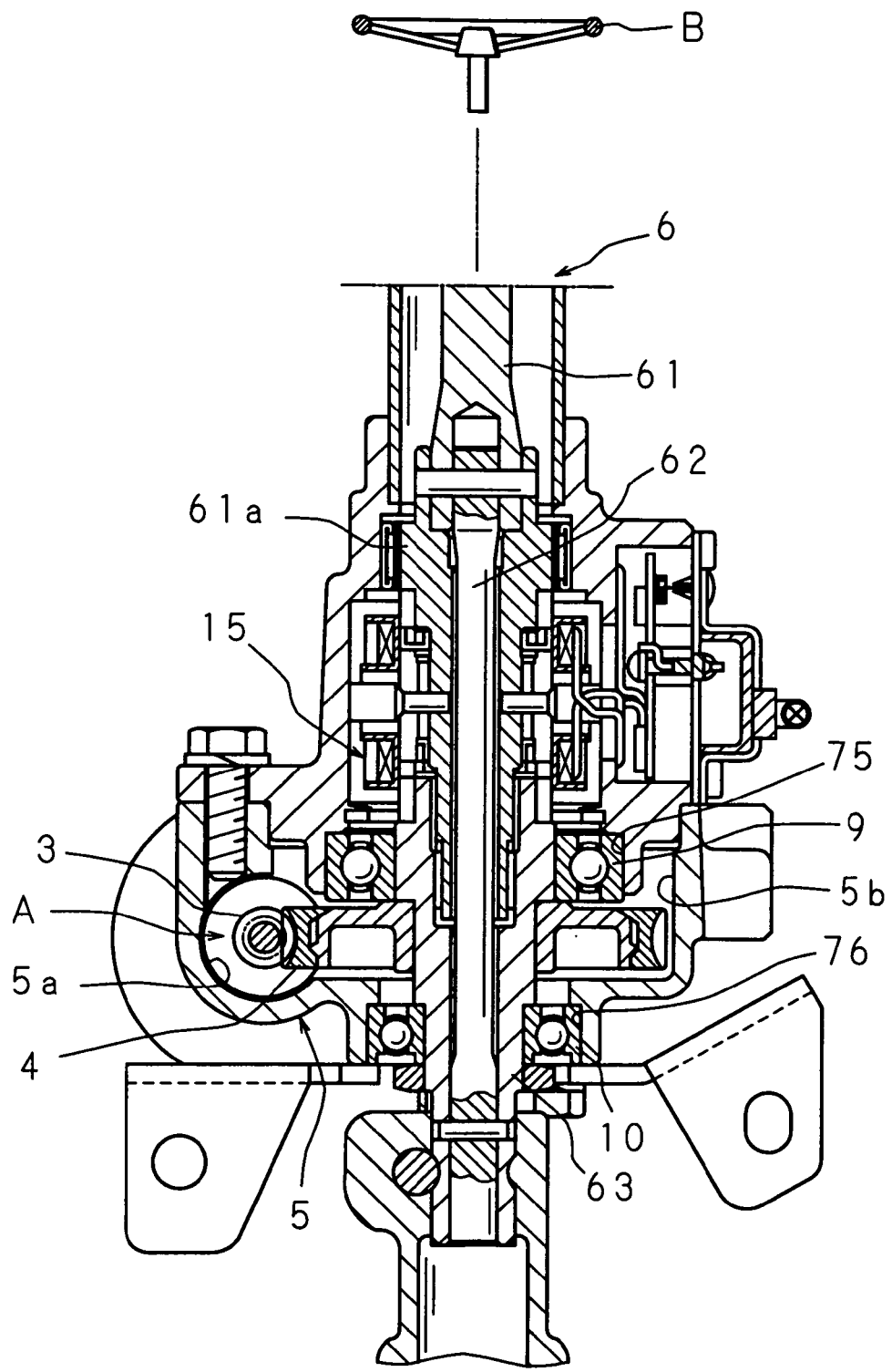
FIG. 2 is a schematic sectional view showing the overall configuration of the electric power steering device in accordance with the present invention.

FIG. 1 is a schematic enlarged sectional view of a reduction gear mechanism portion, showing the configuration of Embodiment 1 of an electric power steering device in accordance with the present invention, and FIG. 2 is a schematic sectional view showing the overall configuration of the electric power steering device in accordance with the present invention.

The electric power steering device comprises an electric motor 1 for assisting steering, a reduction gear mechanism A, a housing 5 serving as a supporting member for incorporating and supporting the reduction gear mechanism A, and a steering means 6 connected to the reduction gear mechanism A. The reduction gear mechanism A has a worm 3 serving as a small gear connected to the output shaft 1a of the electric motor 1 via a shaft coupling 2 having a male joint portion 21 and a female joint portion 22, and a worm wheel 4 serving as a large gear meshing with this worm 3.

The steering means 6 comprises a first steering shaft 61, one end portion of which is connected to a steering wheel B used for steering and the other end portion of which has a cylindrical portion 61a, a torsion bar 62, one end portion of which is inserted into the cylindrical portion 61a of the first steering shaft 61 and connected thereto and which is twisted by the action of steering torque applied on the steering wheel B, and a second steering shaft 63, which is connected to the reduction gear mechanism A and the other end portion of which is connected to the other end portion of the torsion bar 62. In addition, the second steering shaft 63 is connected to a rack-and-pinion steering mechanism (not shown), for example, via a universal joint.

The housing 5 comprises a first housing portion 5a and a second housing portion 5b. The first housing portion 5a incorporates the worm 3 having shaft portions 3b and 3c, smaller than a gear body 3a in diameter, at both end portions of the gear body 3a having a tooth portion comprising multi-arranged teeth, respectively, and rotatably supports the shaft portions 3b and 3c of the worm 3 via roller bearings 7 and 8, respectively. Furthermore, the second housing portion 5b incorporates the worm wheel 4, and supports the second steering shaft 63, to which the worm wheel 4 is secured, via two roller bearings 9 and 10 fitted on the second steering shaft 63.

The first housing portion 5a is configured in a shape extending in the axial direction of the worm 3, and one end portion in the longitudinal direction thereof is provided with a supporting hole 51 in which the roller bearing 7 is internally fitted so as to be supported, a threaded hole 52 connected to this supporting hole 51, and a motor mounting portion 53. A threaded ring 11 for securing the roller bearing 7 is threadably mounted in the threaded hole 52. In addition, the electric motor 1 is mounted on the motor mounting portion 53. The other end portion of the first housing portion 5a is provided with a supporting hole 54 in which the roller bearing 8 is internally fitted so as to be supported.

The shaft portion 3b of the worm 3 of the reduction gear mechanism A, provided at one end portion of the gear body 3a having the tooth portion with multi-arranged teeth, is internally fitted in the inner ring 7a of the roller bearing 7 so as to be movable in the axial direction and is rotatably supported by the housing 5 via the roller bearing 7. On the other hand, the shaft portion 3c provided at the other end portion of the gear body 3a is internally fitted in the inner ring 8a of the roller bearing 8 so as to be movable in the axial direction and is rotatably supported by the housing 5 via the roller bearing 8. The worm wheel 4 is fitted on and secured to the intermediate portion of the second steering shaft 63.

On the one end portion side of the worm 3 born by the roller bearings 7 and 8 so as to be movable in the axial direction as described above, between the gear body 3a and the inner ring 7a of the roller bearing 7, and on the other end portion side, between the gear body 3a and the inner ring 8a of the roller bearing 8, belleville springs 12 and 12 serving as circular elastic bodies for suppressing the movement of the worm 3 in the axial direction, circular limiting members 13 and 13 for limiting the deflection amounts of these belleville springs 12 and 12 and spring receiving portions 14 and 14 integrated with these limiting members 13 and 13 and making contact with the outer circumferential portions of the belleville springs 12 and 12 are respectively provided.

Figure 3:
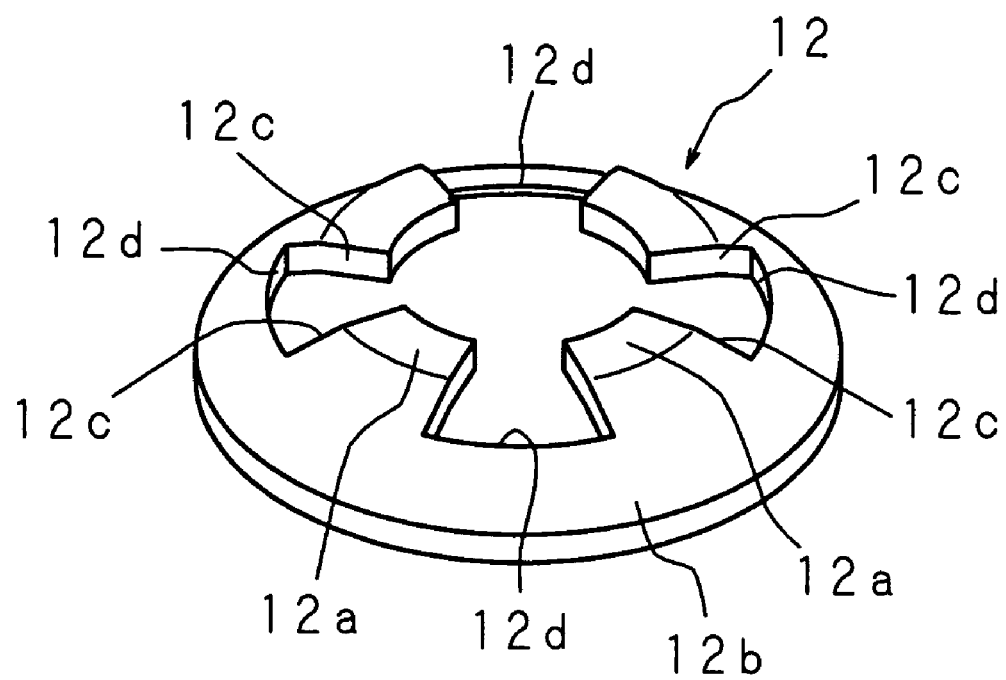
FIG. 3 is a schematic perspective outline view showing the configuration of a belleville spring serving as a circular elastic body in accordance with Embodiment 1.

FIG. 3 is a schematic perspective outline view showing the configuration of the belleville spring 12 serving as a circular elastic body in accordance with Embodiment 1.

The inner circumferential portion of the belleville spring 12 is formed as nonflexible flat portions 12a having planes being orthogonal to the center axis line and arranged radially. In addition, the outer circumferential portion of the belleville spring 12 is formed as a circular flexible tapered portion 12b inclined with respect to the center axis line. The portion on the side of the center axis away from the end portion of each flat portion 12a is provided with an opening having a size capable of allowing the shaft portions 3b and 3c of the worm 3 to be inserted therethrough. Furthermore, the belleville spring 12 has multiple flexible pieces 12c protruding from the tapered portion 12b to the respective flat portions 12a. The inner circumferential portion of each of the flexible pieces 12c is formed as the flat portion 12a.

Moreover, the belleville springs 12 and 12 are assembled between the inner rings 7a and 8a of the roller bearings 7 and 8 on the shaft portions 3b and 3c of the worm 3 and the limiting members 13 and 13, respectively. More specifically, both the belleville springs 12 and 12 are assembled while the shaft portions 3b and 3c of the worm 3 are inserted through the openings in the central portions thereof, respectively, so that the protruding side faces of the respective flat portions 12a make contact with one side faces of the inner rings 7a and 8a of the roller bearings 7 and 8, and so that the outer circumferential fringes of the tapered portions 12b make contact with the spring receiving portions 14 and 14. Hence, the belleville springs 12 and 12 push the inner rings 7a and 8a of the roller bearings 7 and 8 in directions opposite to the gear body 3a of the worm 3, thereby eliminating the clearance between the inner rings 7a and 8a and the clearance between the outer rings 7b and 8b, in other words, the axial clearance between the roller bearings 7 and 8, and suppressing the movement of the worm 3, one way and the other way, in the axial direction with respect to the inner rings 7a and 8a.

The limiting members 13 and 13 are circular members externally fitted on the shaft portions 3b and 3c of the worm 3. Both the limiting members 13 and 13 are in contact with the end faces of the gear body 3a, and make contact with the concave side faces of the flat portions 12a in the case where the belleville springs 12 and 12 are deflected, thereby limiting the deflection amounts of the belleville springs 12 and 12.

The spring receiving portions 14 and 14 are formed in a disc shape so as to be integrated with the one end portions of the limiting members 13 and 13.

The output shaft 1a of the electric motor 1 is coupled to the shaft portion 3b of the worm 3 via the male joint portion 21 and the female joint portion 22 having serrations so as to be relatively movable in the axial direction. The male joint portion 21 is configured by providing a serration on the circumferential face of the shaft portion 3b. In addition, the female joint portion 22 is configured by providing a serration on the inside of a cylindrical member fitted in and secured to the output shaft 1a. The male joint portion 21 is fitted in the female joint portion 22 using the serrations.

The housing 5 incorporates a torque sensor 15 for detecting the steering torque applied to the steering wheel B and corresponding to the relative rotational displacement amount between the first steering shaft 61 and the second steering shaft 63 depending on the torsion of the torsion bar 62. The device is configured that the electric motor 1 is drive-controlled on the basis of the torque value or the like detected by this torque sensor 15.

In Embodiment 1 of the electric power steering device in accordance with the present invention configured as described above, the shaft portion 3b on the one end portion side of the worm 3 is movably coupled to the output shaft 1a of the electric motor 1 via the shaft coupling 2, and the shaft portion 3b is born by the roller bearing 7 so as to be rotatable and movable in the axial direction. In addition, the shaft portion 3c on the other end portion side is born by the roller bearing 8 so as to be rotatable and movable in the axial direction. Furthermore, the belleville springs 12 and 12 and the limiting members 13 and 13 having the spring receiving portions 14 and 14 are assembled between the gear body 3a of the worm 3 and the inner rings 7a and 8a of the roller bearings 7 and 8, respectively. In addition, the belleville springs 12 and 12 act to suppress the worm 3 from moving in the axial direction.

Hence, in the case where steering is performed in a steering range wherein the electric motor 1 is not driven, more specifically, in a steering range wherein the steering angle of a vehicle running at high speed is a small angle of approximately one degree, for example, the steering force of the steering wheel B is transmitted to the worm 3 via the first steering shaft 61, the torsion bar 62, the second steering shaft 63 and the worm wheel 4. As a result, by the component force applied to the worm 3 in the axial direction, the worm 3 is moved, one way or the other way, in the axial direction while deflecting the tapered portion 12b of the one or the other belleville spring 12. Hence, since the rotational angle of the worm 3 becomes small, the transmission from the worm 3 to the output shaft 1a of the electric motor 1 can be relieved; eventually, the steering load in the steering range wherein the electric motor 1 is not driven is reduced, and steering feeling is improved.

Figure 4:
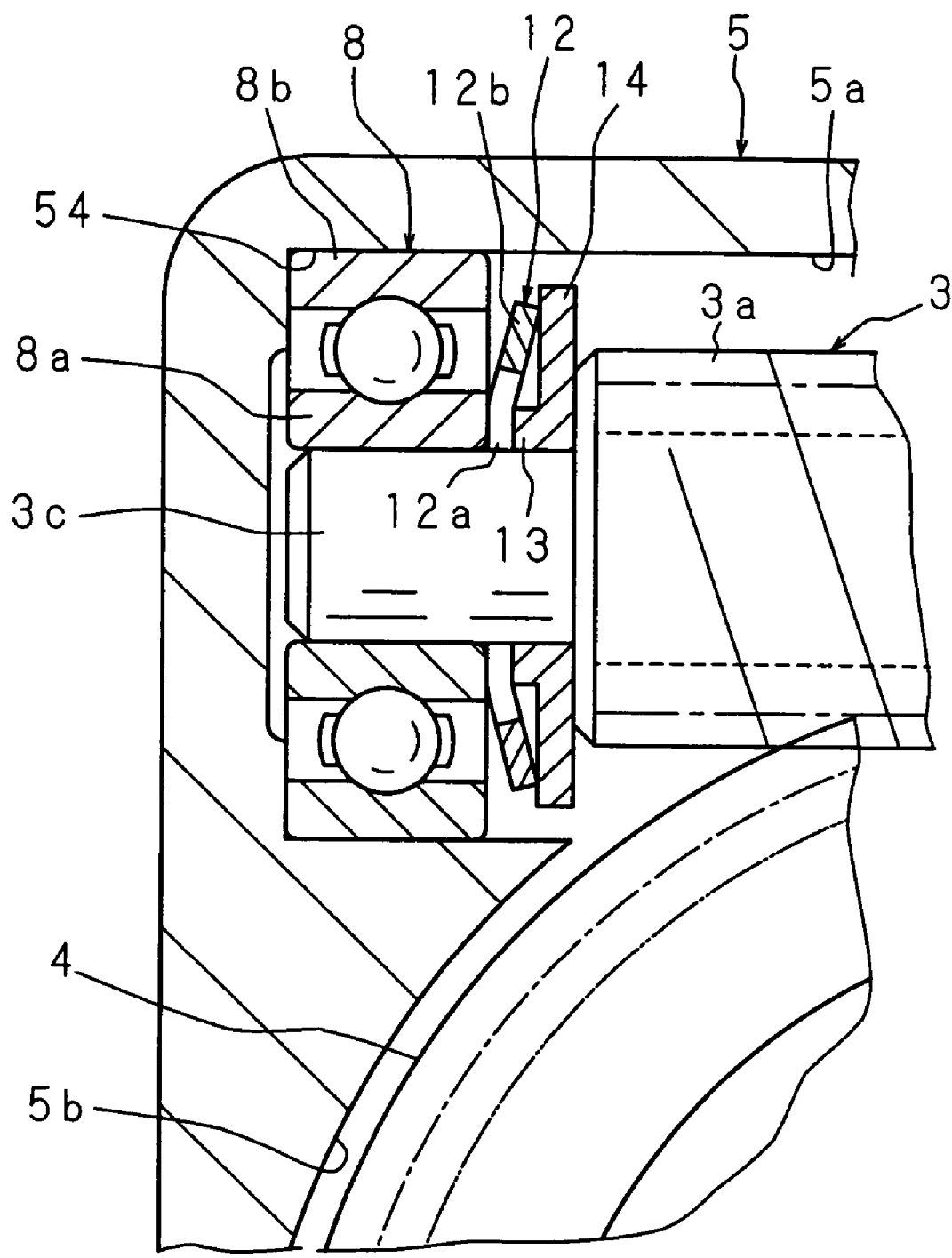
FIG. 4 is a schematic sectional view showing a state wherein the limiting member of Embodiment 1 limits the deflection amount of the belleville spring serving as a circular elastic body.

FIG. 4 is a schematic sectional view showing a state wherein the limiting member 13 of Embodiment 1 limits the deflection amount of the belleville spring 12 serving as a circular elastic body. The state on the side of the shaft portion 3c of the worm 3 is exemplified in FIG. 4.

In the case where the force applied to the side of the shaft portion 3c of the worm 3 in the axial direction is relatively large, the deflection amount of the tapered portion 12b of the belleville spring 12 increases, and the shape of the belleville spring 12 becomes flatter than its ordinary shape as a whole. However, in this case, the deflection amount of the tapered portion 12b of the belleville spring 12 can be limited by the limiting member 13. For example, in the case where the worm 3 moves to the side of the shaft portion 3c in the axial direction, the movement force of the worm 3 is transmitted from the end face of the gear body 3a to the belleville spring 12 via the spring receiving portion 14 provided on the side of the shaft portion 3c, the tapered portion 12b is deflected, and the belleville spring 12 is flattened. As the deflection amount of the tapered portion 12b increases, the limiting member 13 makes contact with the concave side faces of the flat portions 12a of the belleville spring 12, whereby further movement of the worm 3 to the side of the shaft portion 3c is limited. As a result, the deflection amount of the tapered portion 12b of the belleville spring 12 is also limited; therefore, the plastic deformation of the belleville spring 12 is prevented and the durability thereof is improved.

In addition, the inner circumferential portions of the belleville springs 12 and 12 are formed as flat portions 12a, and each of the limiting members 13 and 13 makes contact with the flat portions 12a to limit the deflection amount of the tapered portion 12b; therefore, the limiting members 13 and 13 can be disposed in the spaces between the inner and outer fringes of the belleville springs 12 and 12, without increasing the size of the portion of the worm 3. Furthermore, even in the case where the belleville springs 12 and 12 are rotated in the circumferential direction owing to vibration or the like applied to the worm 3, positioning means for determining the circumferential positions of the belleville springs 12 and 12 are not necessary; hence, the number of man-hours required for working and the number of man-hours required for assembly can be reduced in comparison with the case wherein such positioning means are provided.

In the case where the limiting member 13 is disposed in the space between the inner and outer fringes of the belleville spring 12, it is possible to have a configuration wherein multiple limiting members are provided so as to be opposed to the clearances 12d each provided between the adjacent flexible pieces 12c, and in the case where the belleville spring 12 is deflected, each limiting member 13 passes through the clearance 12d and makes contact with one side face of each of the inner rings 7a and 8a. However, in such a configuration, in the case where the belleville springs 12 and 12 respectively externally fitted on the shaft portions 3b and 3c are rotated in the circumferential direction owing to vibration or the like applied to the worm 3, the circumferential positions of the clearances 12d with respect to the limiting members 13 are misaligned; therefore, it is necessary to provide positioning means for preventing both the belleville springs 12 and 12 from being rotated. In contrast, in the configuration of Embodiment 1 described above, it is not necessary to provide positioning means for preventing the rotation of both the belleville springs 12 and 12.

Furthermore, Embodiment 1 described above has a configuration wherein the flat portions 12a formed at the end portions of the flexible pieces 12c of the belleville springs 12 and 12 are used to function as seats opposed to the inner rings 7a and 8a, and the flat portions 12a make face contact with the one side faces of the inner rings 7a and 8a. Therefore, the stability of both the belleville springs 12 and 12 can be raised without using support members for supporting the flexible pieces 12c of both the belleville springs 12 and 12; hence, the number of components can be reduced although the two belleville springs 12 and 12 are provided, and the cost of the electric power steering device can be reduced in comparison with the case wherein the above-mentioned supporting members are used.

Although Embodiment 1 described above has a configuration wherein the limiting members 13 and 13 are provided as components separate from the worm 3, the shaft portions 3b and 3c may be machined so that the limiting members 13 and 13 are formed so as to be integrated with the shaft portions 3b and 3c of the worm 3, in other words, the limiting member 13 is formed integrally. In addition, although Embodiment 1 is configured that the limiting members 13 and 13 are formed so as to be integrated with the spring receiving portions 14 and 14, the worm 3 may be machined so that the spring receiving portions 14 and 14 are integrated with the gear body 3a of the worm 3, for example. Furthermore, although Embodiment 1 is configured that the flat portions 12a of the belleville springs 12 and 12 are made contact with the one side faces of the inner rings 7a and 8a of the roller bearings 7 and 8, respectively, Embodiment 1 may also be configured that the directions of the belleville springs 12 and 12 are reversed, that the flat portions 12a are made contact with the end faces of the gear body 3a of the worm 3, and that the limiting members 13 and 13 and the spring receiving portions 14 and 14 are provided between the belleville springs 12 and 12 and the inner rings 7a and 8a, respectively. Moreover, although the belleville spring 12 is configured to have the flexible pieces 12c on the sides of the flat portions 12a, the belleville spring 12 may also be configured that the flat portions are formed into a circular shape, that the tapered portion 12b is formed into a radial shape, and that the flexible piece 12c is provided for each of the radial portions. Still further, the belleville spring 12 may have a structure wherein the clearances 12d are not provided.

Embodiment 2

Figure 5:
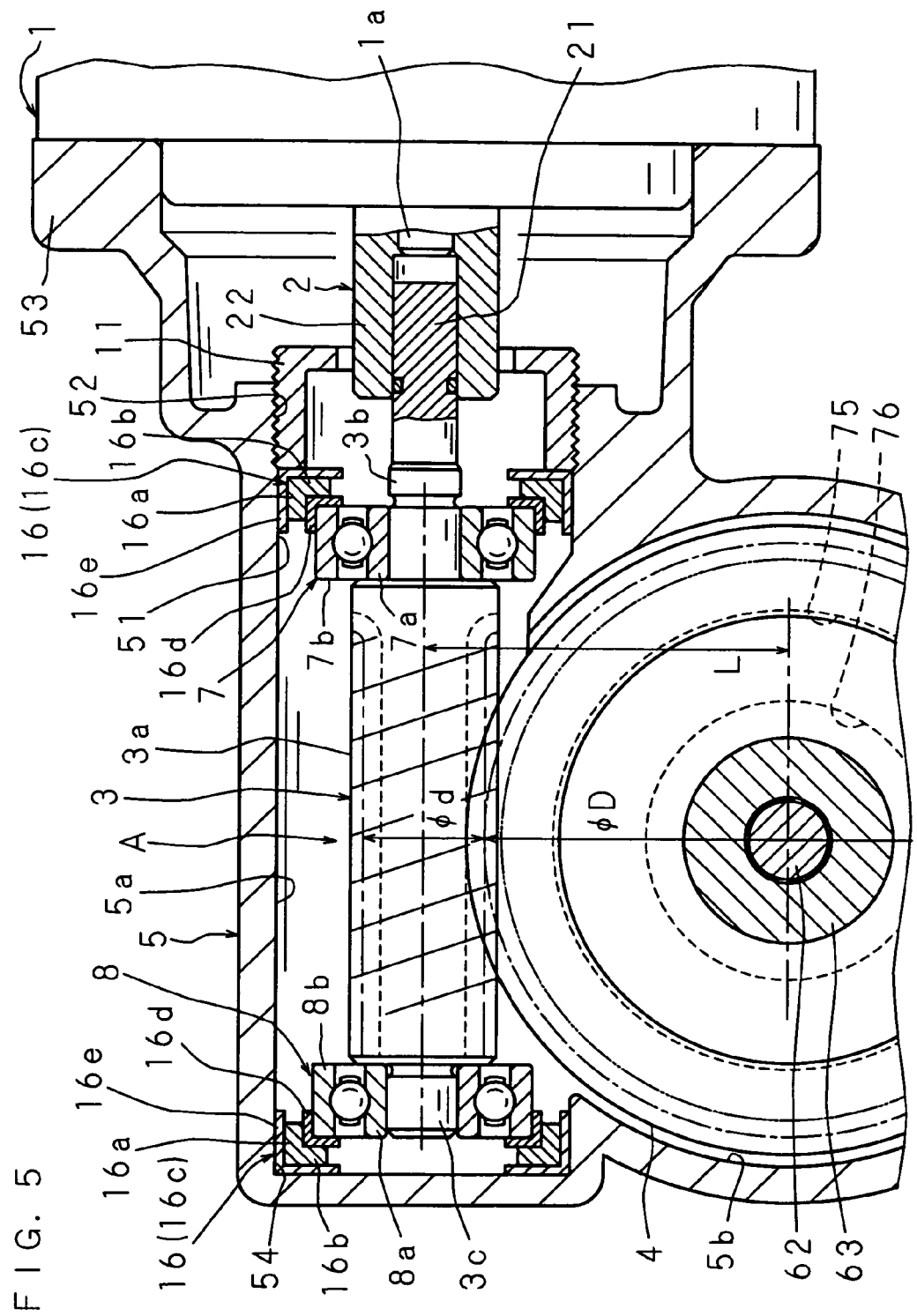
FIG. 5 is a schematic enlarged sectional view of a reduction gear mechanism portion, showing the configuration of Embodiment 2 of the electric power steering device in accordance with the present invention.

FIG. 5 is a schematic enlarged sectional view of a reduction gear mechanism portion, showing the configuration of Embodiment 2 of the electric power steering device in accordance with the present invention.

Embodiment 2 of the electric power steering device in accordance with the present invention is configured that, instead of the belleville springs 12 and 12, elastic circular bodies 16 and 16 capable of suppressing the movement of the worm 3 in the axial direction and capable of pushing the worm 3 toward the worm wheel 4 are provided. The worm 3 is rotatably supported on the housing 5 via the roller bearings 7 and 8 and the elastic circular bodies 16 and 16.

The elastic circular bodies 16 and 16 are externally fitted on the outer rings 7b and 8b of the roller bearings 7 and 8, respectively, and configured in a nearly L-shape in cross section so as to have first circular portions 16*a* and 16*a* for pushing the worm 3 toward the worm wheel 4 and second circular portions 16*b* and 16*b*, protruding inward in the radial direction from the one end portions of the first circular portions 16*a* and 16*a* and making contact with the side faces of the outer rings 7*b* and 8*b*, for suppressing the movement of the worm 3 in the axial direction. In addition, the elastic circular bodies 16 and 16 are provided with elastic members 16*c* and 16*c* made of rubber and reinforcing members 16*d*, 16*d*, 16*e* and 16*e* having a nearly L-shape in cross section and laminated inside and outside the elastic members 16*c* and 16*c*, respectively. The reinforcing members 16*d* and 16*d* provided inside are press-fitted on the outer rings 7*b* and 8*b* of the roller bearings 7 and 8, respectively, and the reinforcing members 16*e* and 16*e* provided outside are press-fitted in the supporting holes 51 and 54, respectively. The reinforcing members 16*d*, 16*d*, 16*e* and 16*e* are made of metal or resin and bonded to the elastic members 16*c* and 16*c* using a vulcanized adhesive or the like.

The pushing of the worm 3 toward the worm wheel 4 by the first circular portions 16*a* and 16*a* is made possible, for example, by setting the distance L between the center of the supporting holes 51 and 54 and the center of the supporting holes 75 and 76, in which the roller bearings 9 and 10 are fitted so as to be supported, smaller than the dimension obtained by adding φd/2, half of the pitch circle diameter φd of the worm 3, to φD/2, half of the pitch circle diameter φD of the worm wheel 4. With this setting, in the case where the shaft portions 3*b* and 3*c* of the worm 3 are born by the roller bearings 7 and 8, the first circular portions 16*a* and 16*a* are deflected, and the worm 3 is pushed toward the worm wheel 4 by the elastic restoration forces of the first circular portions 16*a* and 16*a*; hence, a preload is applied to the meshing portion.

In Embodiment 2 shown in FIG. 5, the elastic restoration forces of the first circular portions 16*a* and 16*a* are applied to the worm 3, and the worm 3 is pushed toward the portion meshing with worm wheel 4; hence, the backlash amount at the meshing portion can be reduced. In addition, in a configuration wherein at least the gear body of the worm wheel 4 is made of synthetic resin to reduce the meshing noise generated when meshing with the worm 3, even in the case where the gear body of the worm wheel 4 is swollen owing to moisture and the swollen gear body is pushed toward the worm 3, the first circular portions 16*a* and 16*a* are deflected, and the rotational torque applied to the meshing portion can be reduced.

Furthermore, in the case where steering is performed in a steering range wherein the electric motor 1 is not driven, in other words, in a steering range wherein the steering angle of a vehicle running at high speed is a small angle of approximately one degree, for example, when the worm 3 is moved, one way or the other way, in the axial direction, the second circular portion 16*b* of the elastic circular body 16 is deflected, and the rotational angle of the worm 3 becomes small. Hence, the transmission from the worm 3 to the output shaft 1*a* of the electric motor 1 can be relieved; eventually, the steering load in the steering range wherein the electric motor 1 is not driven is reduced, and steering feeling is improved.

As described above, in Embodiment 2, the gear meshing noise owing to the backlash at the meshing portion can be reduced by the elastic circular bodies 16 and 16 for supporting the worm 3, the rotational torque can also be reduced, and the steering feeling in the steering range wherein the electric motor 1 is not driven can be improved.

The reduction gear mechanism A in accordance with Embodiments 1 and 2 described above may be a hypoid gear comprising a hypoid pinion serving as a small gear and a hypoid wheel serving as a large gear, instead of the worm gear comprising the worm 3 serving as a small gear and the worm wheel 4 serving as a large gear. Furthermore, the small gear and the large gear may be helical gears or may be gears obtained by combining part of a helical gear and part of a worm gear.

Still further, although the flexible pieces 12*c* of the belleville spring 12, four in number, equally distributed in the circumferential direction, are exemplified in Embodiment 1, the number of the flexible pieces can be changed variously, provided that they are equally distributed.

Embodiment 3

Figure 6:
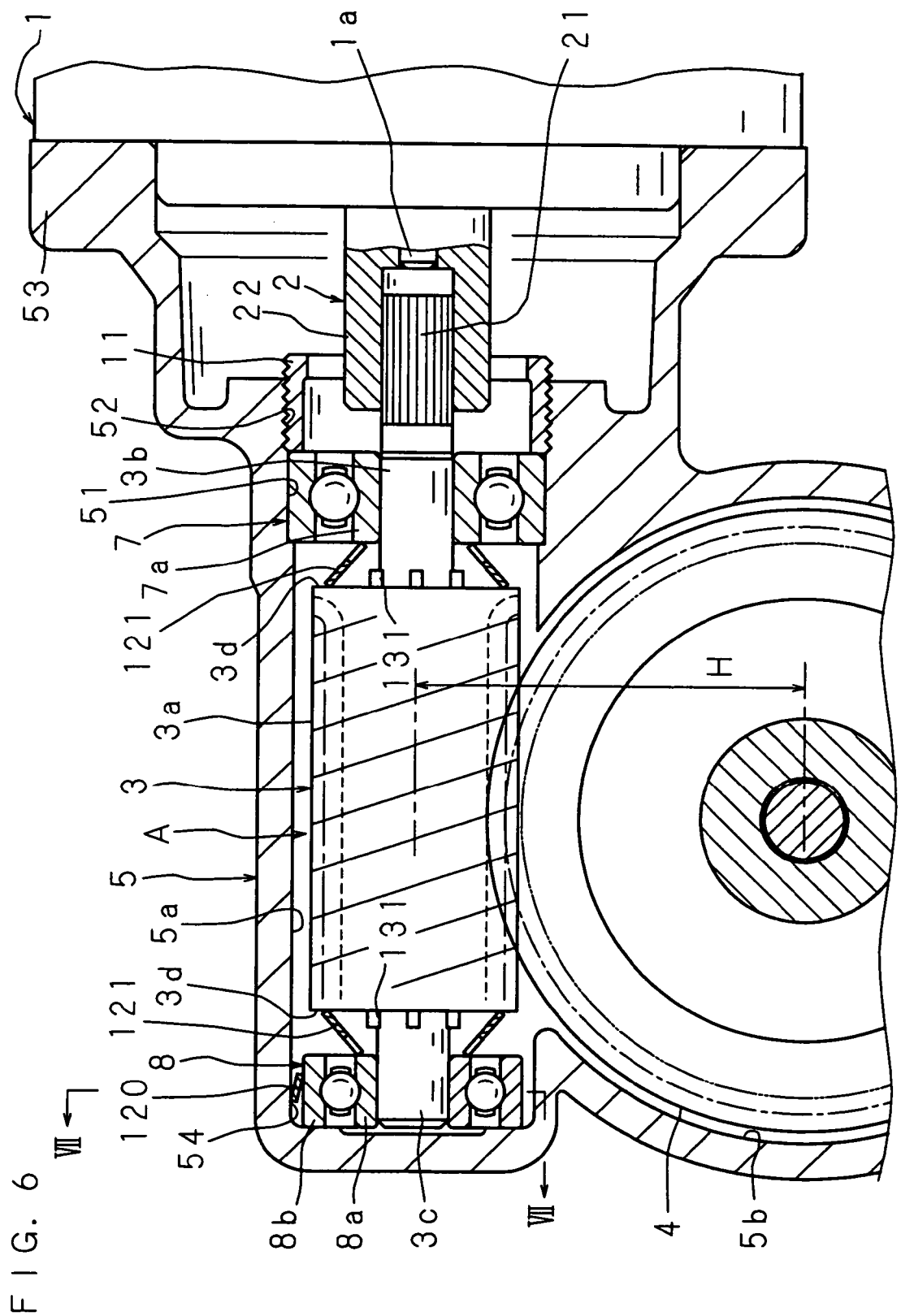
FIG. 6 is a schematic enlarged sectional view of a reduction gear mechanism portion, showing the configuration of Embodiment 3 of the electric power steering device in accordance with the present invention.
Figure 7:
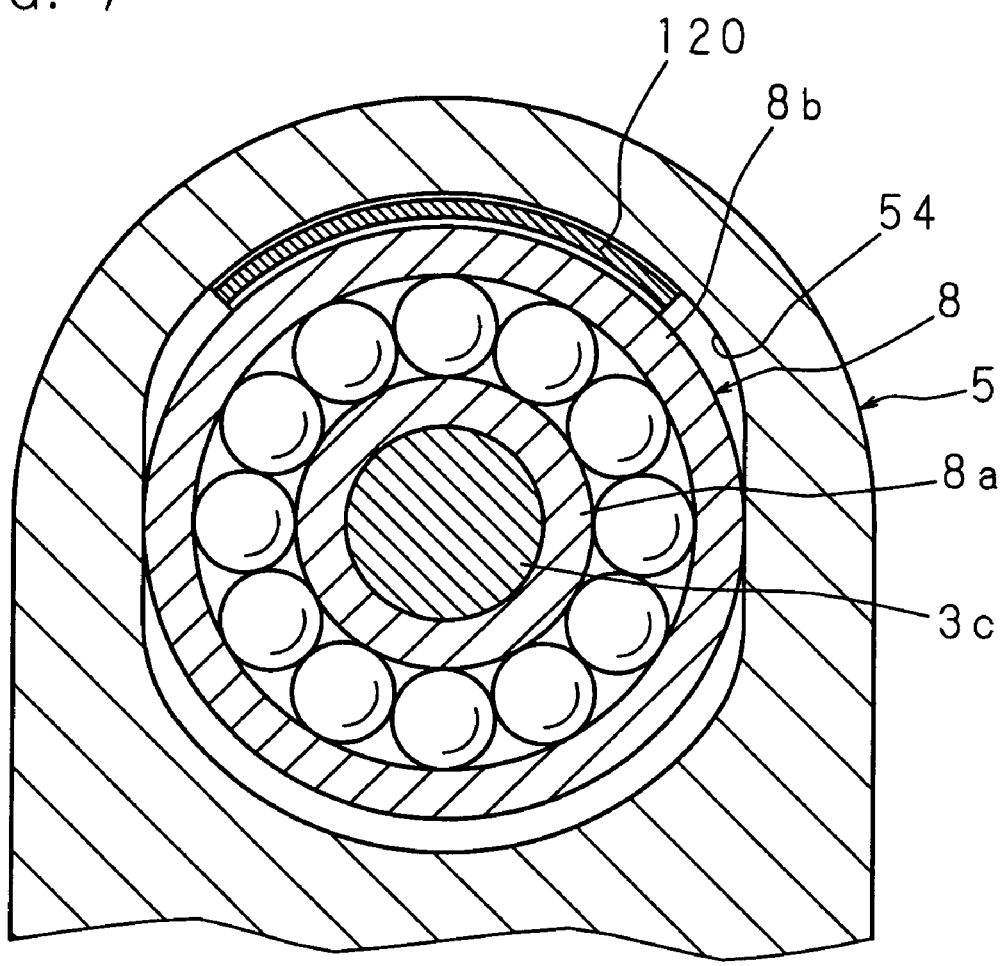
FIG. 7 is a schematic enlarged sectional view taken on line VII-VII of FIG. 6.

Next, Embodiment 3 of the electric power steering device in accordance with the present invention will be described below. FIG. 6 is a schematic enlarged sectional view of a reduction gear mechanism portion, showing the configuration of Embodiment 3 of the electric power steering device in accordance with the present invention, and FIG. 7 is a schematic enlarged sectional view taken on line VII-VII of FIG. 6.

In Embodiment 3 of the electric power steering device in accordance with the present invention, the supporting hole 54, provided in the other end portion of the first housing portion 5*a* of the housing 5, for supporting the roller bearing 8 is configured into an elliptic shape that is made eccentric in a direction wherein the distance H between the rotational centers of the worm 3 and the worm wheel 4 becomes long or short. Hence, the roller bearing 8 can be moved in the direction wherein the distance H between the rotational centers of the worm 3 and the worm wheel 4 becomes long or short. A leaf spring 120, being deflected and serving as an energizing means for energizing the roller bearing 8 so that the distance H between the rotational centers of the worm 3 and the worm wheel 4 becomes short, is disposed between the supporting hole 54 and the outer ring 8*b* of the roller bearing 8 on the opposite side of the worm wheel 4.

This leaf spring 120 is deflected in an arch shape along the outer circumferential face of the roller bearing 8 and is formed in a shape being inclined from one fringe to the other fringe in the width direction with respect to the outer circumferential face of the roller bearing 8, whereby deflection is made possible between the supporting hole 54 and the outer ring 8*b*. The elastic restoration force of the leaf spring 120 energizes the worm 3 via the roller bearing 8 so that the distance H between the rotational centers of the worm 3 and the worm wheel 4 becomes short.

The worm 3 of the reduction gear mechanism A has a gear body 3*a* having multi-arranged teeth and shaft portions 3*b* and 3*c* being smaller than the gear body 3*a* in diameter and connected to both end portions of the gear body 3*a* via step portions 3*d* and 3*d* formed in the radial direction. The one shaft portion 3*b* is internally fitted in the inner ring 7*a* of the roller bearing 7 so as to be movable in the axial direction, thereby being rotatably supported by the housing 5 via the roller bearing 7. The other shaft portion 3*c* is internally fitted in the inner ring 8*a* of the roller bearing 8 so as to be movable in the axial direction, thereby being rotatably supported by the housing 5 via the roller bearing 8. The worm wheel 4 is fitted on and secured to the intermediate portion of the second steering shaft 63.

Between the step portions 3*d* and 3*d* of the worm 3 born by the roller bearings 7 and 8 so as to be movable in the axial direction as described above and the inner rings 7*a* and 8*a*, belleville springs 121 and 121 serving as elastic bodies for suppressing the movement of the worm 3 in the axial direction and convex portions 131 and 131 serving as limiting members for limiting the deflection amounts of the belleville springs 121 and 121 are provided respectively.

Figure 8:
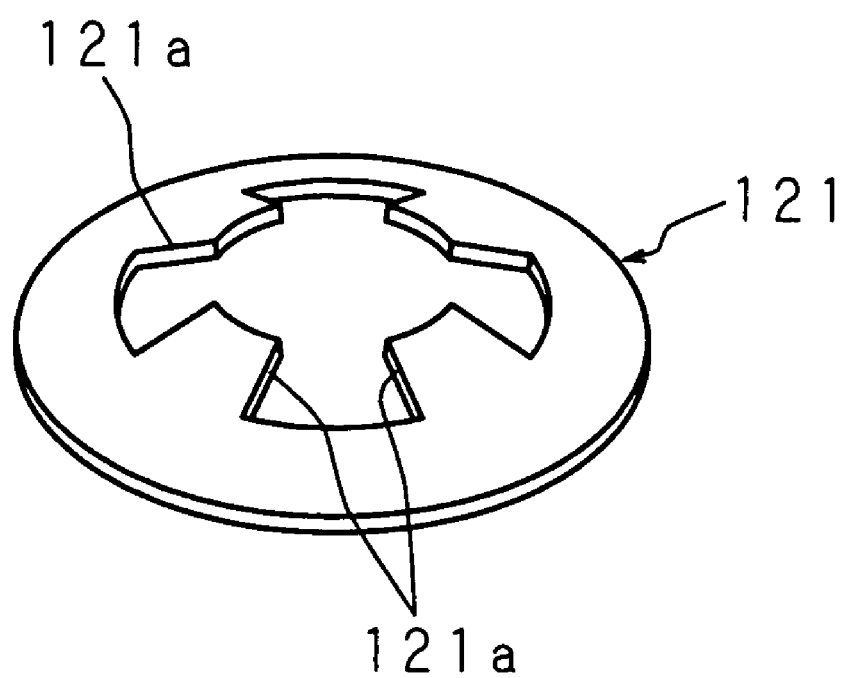
FIG. 8 is a schematic enlarged perspective view showing the configuration of the belleville spring serving as an elastic body of Embodiment 3.

FIG. 8 is a schematic enlarged perspective view showing the configuration of the belleville spring 121 serving as an elastic body of Embodiment 3.

The belleville spring 121 is formed in a taper shape inclined from the inner fringe to the outer fringe with respect to the center axis so as to have flexibility, and from the intermediate portion in the radial direction to the inner fringe, multiple flexible pieces 121*a* are equally distributed. The portion on the side of the center axis away from the end portion of each flexible piece 121*a* is provided with an opening having a size capable of allowing the shaft portions 3*b* and 3*c* of the worm 3 to be inserted therethrough. In addition, the belleville springs 121 and 121 are installed so that the inner fringe portions thereof make contact with the inner rings 7*a* and 8*a*, respectively, and so that the outer fringe portions thereof make contact with the step portions 3*d* and 3*d* of the shaft portions 3*b* and 3*c* of the worm 3, respectively. Hence, the belleville springs 121 and 121 push the inner rings 7*a* and 8*a* of the roller bearings 7 and 8 in directions opposite to the gear body 3*a* of the worm 3, thereby eliminating the clearance between the inner rings 7*a* and 8*a* and the clearance between the roller bearings 7 and 8, in other words, the axial clearance between the roller bearings 7 and 8, and suppressing the movement of the worm 3, one way and the other way, in the axial direction with respect to the inner rings 7*a* and 8*a*.

The convex portions 131 and 131 are provided so as to protrude from and be integrated with the worm 3 at multiple places in the circumferential direction at portions on the sides of the step portions 3*d* and 3*d* of the shaft portions 3*b* and 3*c* and inside the belleville springs 121 and 121. In addition, the convex portions 131 and 131 are positioned outside the outer circumferences of the shaft portions 3*b* and 3*c*; as the worm 3 moves in the axial direction, the convex portions 131 on the side of the one shaft portion 3*b* make contact with the side face of the inner ring 7*a* of the roller bearing 7 on the side of the gear body 3*a*, or the convex portions 131 on the side of the other shaft portion 3*c* make contact with the side face of the inner ring 8*a* of the roller bearing 8 on the side of the gear body 3*a*, thereby limiting the deflection amounts of the belleville springs 121 and 121, respectively.

In Embodiment 3 of the electric power steering device in accordance with the present invention configured as described above, the shaft portion 3*b* on the one end portion side of the worm 3 is movably coupled to the output shaft 1*a* of the electric motor 1 via the shaft coupling 2, and the shaft portion 3*b* is born by the roller bearing 7 so as to be rotatable and movable in the axial direction. In addition, the shaft portion 3*c* on the other end portion side is born by the roller bearing 8 so as to be rotatable and movable in the axial direction. Furthermore, the belleville springs 121 and 121 are provided between the inner rings 7*a* and 8*a* of the roller bearings 7 and 8 and the step portions 3*d* and 3*d* of the worm 3, respectively. In addition, the belleville springs 121 and 121 act to suppress the movement of the worm 3 in the axial direction.

Hence, in the case where steering is performed in a steering range wherein the electric motor 1 is not driven, in other words, in a steering range wherein the steering angle of a vehicle running at high speed is a small angle of approximately one degree, for example, the steering force of the steering wheel B is transmitted to the worm 3 via the first steering shaft 61, the torsion bar 62, the second steering shaft 63 and the worm wheel 4. As a result, by the component force applied to the worm 3 in the axial direction, the worm 3 is moved one way in the axial direction while deflecting the flexible pieces 121*a* of the one belleville spring 121 or the other way in the axial direction while deflecting the flexible pieces 121*a* of the other belleville spring 121. Hence, since the rotational angle of the worm 3 becomes small, the transmission from the worm 3 to the output shaft 1*a* of the electric motor 1 can be relieved; eventually, the steering load in the steering range wherein the electric motor 1 is not driven is reduced, and steering feeling is improved.

Furthermore, in the case where the force applied to the worm 3 in the axial direction is relatively large, the deflection amounts of the flexible pieces 121*a* of the one belleville spring 121 increase; however, the deflection amounts of the flexible pieces 121*a* of the belleville spring 121 can be limited by the convex portions 131. For example, in the case where the worm 3 moves one way in the axial direction, the movement force of the worm 3 is transmitted from the step portion 3*d* to the belleville spring 121; hence, the flexible pieces 121*a* of the belleville spring 121 are deflected, and the belleville spring 121 is flattened wholly. As the deflection amounts of the flexible pieces 121*a* increase, the convex portions 131 make contact with the one side face (the face opposed to the side of the gear body 3*a* of the worm 3) of the inner ring 7*a* or 8*a*; hence, the movement of the worm 3 can be limited. As a result, the deflection amounts of the belleville springs 121 and 121 are also limited; therefore, the plastic deformation of the belleville springs 121 and 121 is prevented and the durability thereof is improved.

In addition, the step portions 3*d* and 3*d* provided at both end portions of the gear body 3*a* of the worm 3 function as seats for receiving the belleville springs 121 and 121; hence, the structure for supporting the belleville springs 121 and 121 is simplified, and the machinability and assembly workability are improved.

Furthermore, since the convex portions 131 and 131 are formed so as to be integrated with the shaft portions 3*b* and 3*c*, the limiting members can be provided without increasing the number of components; hence, the assembly workability is improved, and the cost is reduced although the limiting members are provided.

Moreover, the roller bearing 8 incorporated in the first housing portion 5*a* of the housing 5 and used to bear the shaft portion 3*c* of the worm 3 is energized in a direction wherein the distance H between the rotational centers of the worm 3 and the worm wheel 4 becomes short. Hence, the backlash amount at the meshing portion of the worm 3 and the worm wheel 4 can be reduced; besides, even in the case where the abrasion amounts of the teeth of the worm 3 and the worm wheel 4 increase, the backlash amount at the meshing portion can be reduced.

Still further, in the case where the worm 3 is attempted to be moved by meshing reaction forces, kickback, etc. applied to the meshing portion in a direction wherein the distance H between the rotational centers becomes long, the leaf spring 120 is deflected, and the movement of the worm 3 is suppressed; hence, the meshing noise owing to meshing reaction forces, kickback, etc. is reduced.

Although Embodiment 3 described above has a configuration wherein the convex portions 131 and 131 serving as limiting members are provided so as to be integrated with the shaft portions 3*b* and 3*c*, limiting members formed into a circular shape, for example, separate from the shaft portions 3*b* and 3*c*, may be externally fitted on the shaft portions 3*b* and 3*c*. Furthermore, the limiting members may be structured so as to be continuous around the outer circumferences of the shaft portions 3*b* and 3*c* of the worm 3, or may have one convex portion or multiple convex portions spaced in the circumferential direction. Moreover, for example, the limiting members can also be configured, for example, that the portions between the adjacent flexible pieces 121a of the belleville spring 121 are deflected to the protruding side of the belleville spring 121 in parallel with the center axis line and that the bent portions are used as limiting members.

In addition, although the belleville spring 121 of Embodiment 3 described above has a structure wherein the flexible pieces 121a are provided in the inner circumferential portion, the belleville spring 121 may have a structure wherein the flexible pieces 121a are provided in the outer circumferential portion. Furthermore, the belleville spring 121 may have a structure wherein the flexible pieces 121a are not provided.

Moreover, in Embodiment 3 described above, although the leaf spring 120 is used as an energizing means for energizing the roller bearing 8 in the direction wherein the distance H between the rotational centers of the worm 3 and the worm wheel 4 becomes short, an elastic body, such as synthetic resin having flexibility, rubber or coil spring, may also be used as the energizing means.

In addition, the reduction gear mechanism A in accordance with Embodiment 3 described above may be a hypoid gear comprising a hypoid pinion serving as a small gear and a hypoid wheel serving as a large gear, instead of the worm gear comprising the worm 3 serving as a small gear and the worm wheel 4 serving as a large gear. Furthermore, the small gear and the large gear may be helical gears or may be gears obtained by combining part of a helical gear and part of a worm gear.

Next, Embodiments 4 and 5 of the electric power steering device in accordance with the present invention will be described below.

Embodiment 4

Figure 9:
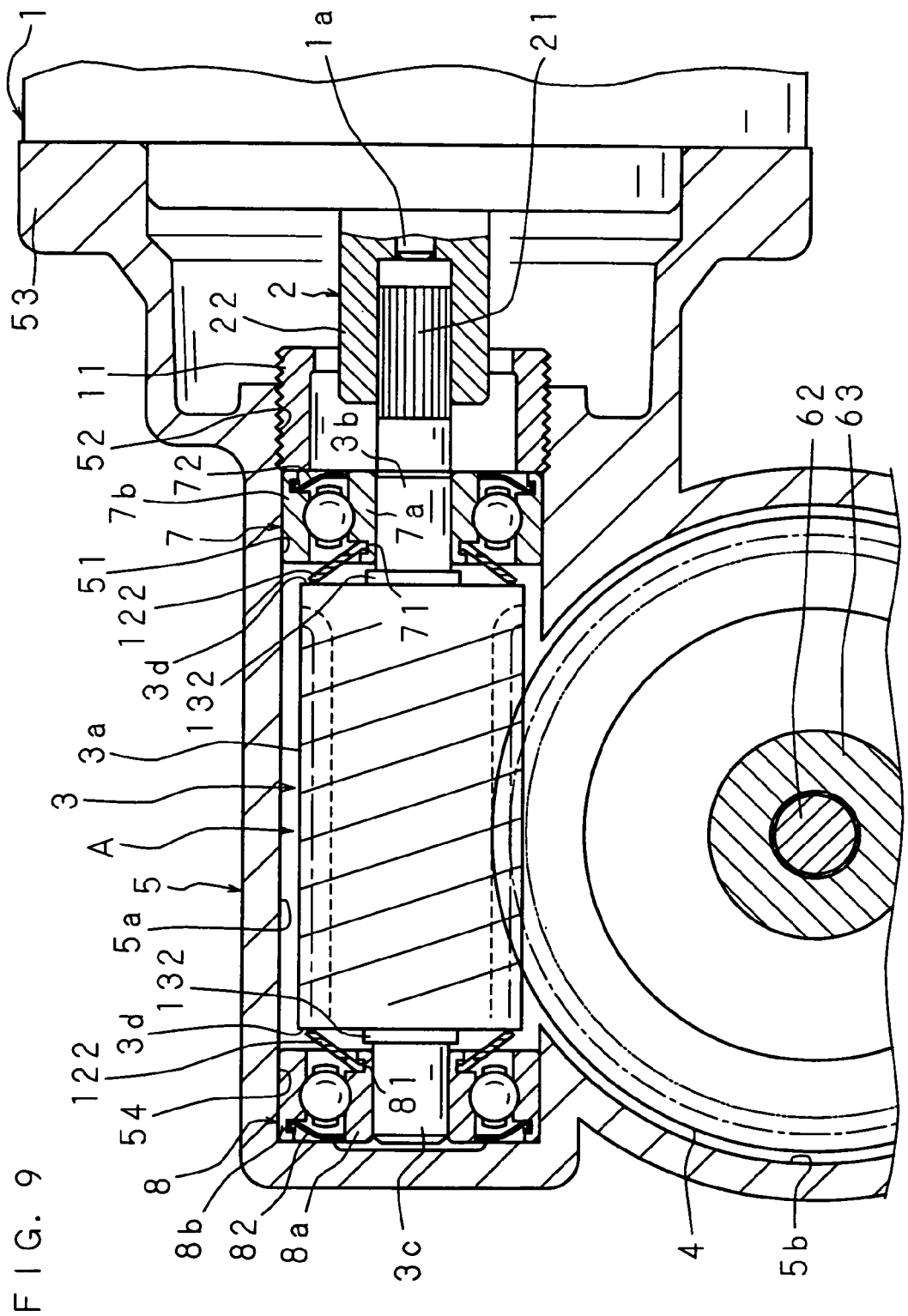
FIG. 9 is a schematic enlarged sectional view of a reduction gear mechanism portion, showing the configuration of Embodiment 4 of the electric power steering device in accordance with the present invention.

FIG. 9 is a schematic enlarged sectional view of a reduction gear mechanism portion, showing the configuration of Embodiment 4 of the electric power steering device in accordance with the present invention.

The worm 3 of the reduction gear mechanism A has a gear body 3a having a tooth portion with multi-arranged teeth and shaft portions 3b and 3c being smaller than the gear body 3a in diameter and connected to both end portions of the gear body 3a via step portions 3d and 3d formed in the radial direction. The one shaft portion 3b is internally fitted in the inner ring 7a of the roller bearing 7 so as to be movable in the axial direction, thereby being rotatably supported by the housing 5 via the roller bearing 7. The other shaft portion 3c is internally fitted in the inner ring 8a of the roller bearing 8 so as to be movable in the axial direction, thereby being rotatably supported by the housing 5 via the roller bearing 8. The worm wheel 4 is fitted on and secured to the intermediate portion of the second steering shaft 63.

In the inner rings 7a and 8a of the roller bearings 7 and 8 for bearing the worm 3 so as to be movable in the axial direction as described above, circular grooves 71 and 81 are each formed on the inner circumferential face between the raceway groove and the side face of the gear body 3a of the worm 3. Between the inner ring 7a of the roller bearing 7 and the step portion 3d and between the inner ring 8a of the roller bearing 8 and the step portion 3d, belleville springs 122 and 122 serving as elastic bodies for suppressing the movement of the worm 3 in the axial direction and convex portions 132 and 132 serving as limiting members for limiting the deflection amounts of the belleville springs 122 and 122 are provided, respectively. Furthermore, on the inner circumferential faces of the outer rings 7b and 8b of both the roller bearings 7 and 8 away from the raceway grooves thereof on the opposite sides of the gear body 3a of the worm 3, respectively, sealing members 72 and 82 for respectively sealing the space between the inner ring 7a and the outer ring 7b and the space between the inner ring 8a and the outer ring 8b are fitted and secured.

Figure 10:
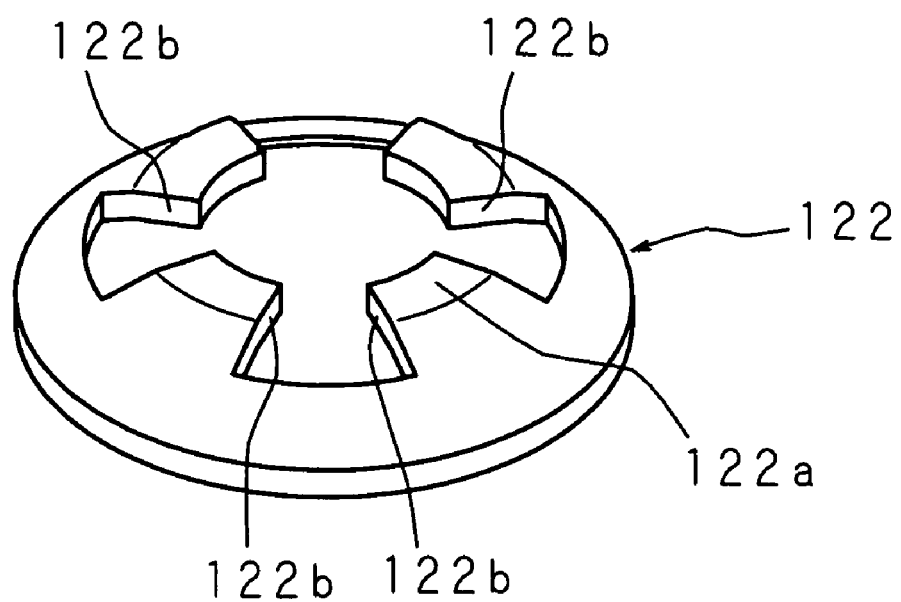
FIG. 10 is a schematic enlarged perspective view showing the configuration of the belleville spring serving as an elastic body of Embodiment 4.

FIG. 10 is a schematic enlarged perspective view showing the configuration of the belleville spring 122 serving as an elastic body of Embodiment 4.

The belleville spring 122 is formed into a flexible taper shape inclined with respect to the center axis line from the fitting inner circumferential portions 122a, being flat and orthogonal to the center axis line, to the outer fringe. The portion on the side of the center axis away from the end portion of each flat fitting inner circumferential portion 122a is provided with an opening having a size capable of allowing the shaft portions 3b and 3c of the worm 3 to be inserted therethrough. Furthermore, the belleville spring 122 has multiple flexible pieces 122b protruding from the intermediate portion in the radial direction to the inner fringe, and the fitting inner circumferential portion 122a is provided at the end portion of each flexible piece 122b. Still further, the belleville springs 122 and 122 are installed so that the fitting inner circumferential portions 122a thereof are externally fitted in the circular grooves 71 and 81 of the inner rings 7a and 8a, respectively, and so that the outer circumferential portions thereof make contact with the step portions 3d and 3d, respectively. Hence, the belleville springs 122 and 122 push the inner rings 7a and 8a of the roller bearings 7 and 8 in directions opposite to the gear body 3a of the worm 3, thereby eliminating the clearance between the inner rings 7a and 8a and the clearance between the outer rings 7b and 8b, in other words, the axial clearance between the roller bearings 7 and 8, and suppressing the movement of the worm 3, one way and the other way, in the axial direction with respect to the inner rings 7a and 8a.

The convex portions 132 and 132 protrude on the sides of the step portions 3d and 3d of both the shaft portions 3b and 3c of the worm 3 at portions inside the outer circumferential portions of the belleville springs 122 and 122, in other words, protrude on the sides of the step portions 3d and 3d inside the outer circumferential portions of the belleville springs 122 and 122 around the entire outer circumferences of the shaft portions 3b and 3c between the inner rings 7a and 8a and the step portions 3d and 3d, respectively, so as to be integrated with the shaft portions 3b and 3c, respectively. In addition, the convex portions 132 and 132 are formed so as to be larger in diameter than the shaft portions 3b and 3c. Hence, as the worm 3 moves in the axial direction, the convex portion 132 on the side of the one shaft portion 3b makes contact with the side face of the inner ring 7a of the roller bearing 7 on the side of the gear body 3a, or the convex portion 132 on the side of the other shaft portion 3c makes contact with the side face of the inner ring 8a of the roller bearing 8 on the side of the gear body 3a, thereby limiting the deflection amounts of the belleville springs 122 and 122.

In Embodiment 4 of the electric power steering device in accordance with the present invention configured as described above, the shaft portion 3b on the one end portion side of the worm 3 is movably coupled to the output shaft 1a of the electric motor 1 via the shaft coupling 2, and the shaft portion 3b is born by the roller bearing 7 so as to be rotatable and movable in the axial direction, and the shaft portion 3c on the other end portion side is born by the roller bearing 8 so as to be rotatable and movable in the axial direction. Furthermore, the belleville springs 122 and 122 are provided between the inner rings 7a and 8a of the roller bearings 7 and 8 and the step portions 3d and 3d of the worm 3, respectively. Furthermore, the belleville springs 122 and 122 act to suppress the movement of the worm 3 in the axial direction.

Hence, in the case where steering is performed in a steering range wherein the electric motor 1 is not driven, in other words, in a steering range wherein the steering angle of a vehicle running at high speed is a small angle of approximately one degree, for example, the steering force of the steering wheel B is transmitted to the worm 3 via the first steering shaft 61, the torsion bar 62, the second steering shaft 63 and the worm wheel 4. As a result, by the component force applied to the worm 3 in the axial direction, the worm 3 is moved, one way or the other way, in the axial direction while deflecting the flexible pieces 122b of the one or the other belleville spring 122. Hence, since the rotational angle of the worm 3 becomes small, the transmission from the worm 3 to the output shaft 1a of the electric motor 1 can be relieved; eventually, the steering load in the steering range wherein the electric motor 1 is not driven is reduced, and steering feeling is improved.

Furthermore, in the case where the force applied to the worm 3 in the axial direction is relatively large, the deflection amounts of the flexible pieces 122b of the one belleville spring 122 increase; however, the deflection amounts of the flexible pieces 122b of this belleville spring 122 can be limited by the convex portion 132. For example, in the case where the worm 3 moves one way in the axial direction, the movement force of the worm 3 is transmitted from the step portion 3d to the belleville spring 122; hence, the flexible pieces 122b of the belleville spring 122 are deflected, and the belleville spring 122 is flattened wholly. As the deflection amounts of the flexible pieces 122b increase, either one of the convex portions 132 makes contact with the one side face (the face opposed to the side of the gear body 3a of the worm 3) of the inner ring 7a or 8a; hence, the movement of the worm 3 can be limited. As a result, the deflection amounts of both the belleville springs 122 and 122 are also limited; therefore, the plastic deformation of both the belleville springs 122 and 122 is prevented and the durability thereof is improved.

In addition, since the fitting inner circumferential portions 122a of both the belleville springs 122 and 122 are externally fitted in the circular grooves 71 and 81 respectively formed in the inner rings 7a and 8a of both the roller bearings 7 and 8, the belleville springs 122 and 122 can be assembled beforehand in the roller bearings 7 and 8, respectively; hence, it is not necessary to assemble both the belleville springs 122 and 122 individually. Therefore, such a mistake of reversing the directions of both the belleville springs 122 and 122 during assembly is not caused; hence, it is possible to eliminate the necessity of reassembling the belleville springs 122 and 122, and the assembly workability can be improved. Furthermore, when the worm 3 moves in the axial direction, the convex portions 132 and 132 can be made contact with the one side faces of the inner rings 7a and 8a, respectively, without interfering with both the belleville springs 122 and 122.

Furthermore, since the convex portions 132 and 132 are formed so as to be integrated with the shaft portions 3b and 3c, the limiting members can be provided without increasing the number of components; hence, the assembly workability is improved, and the cost is reduced although the limiting members are provided.

Embodiment 5

Figure 11:
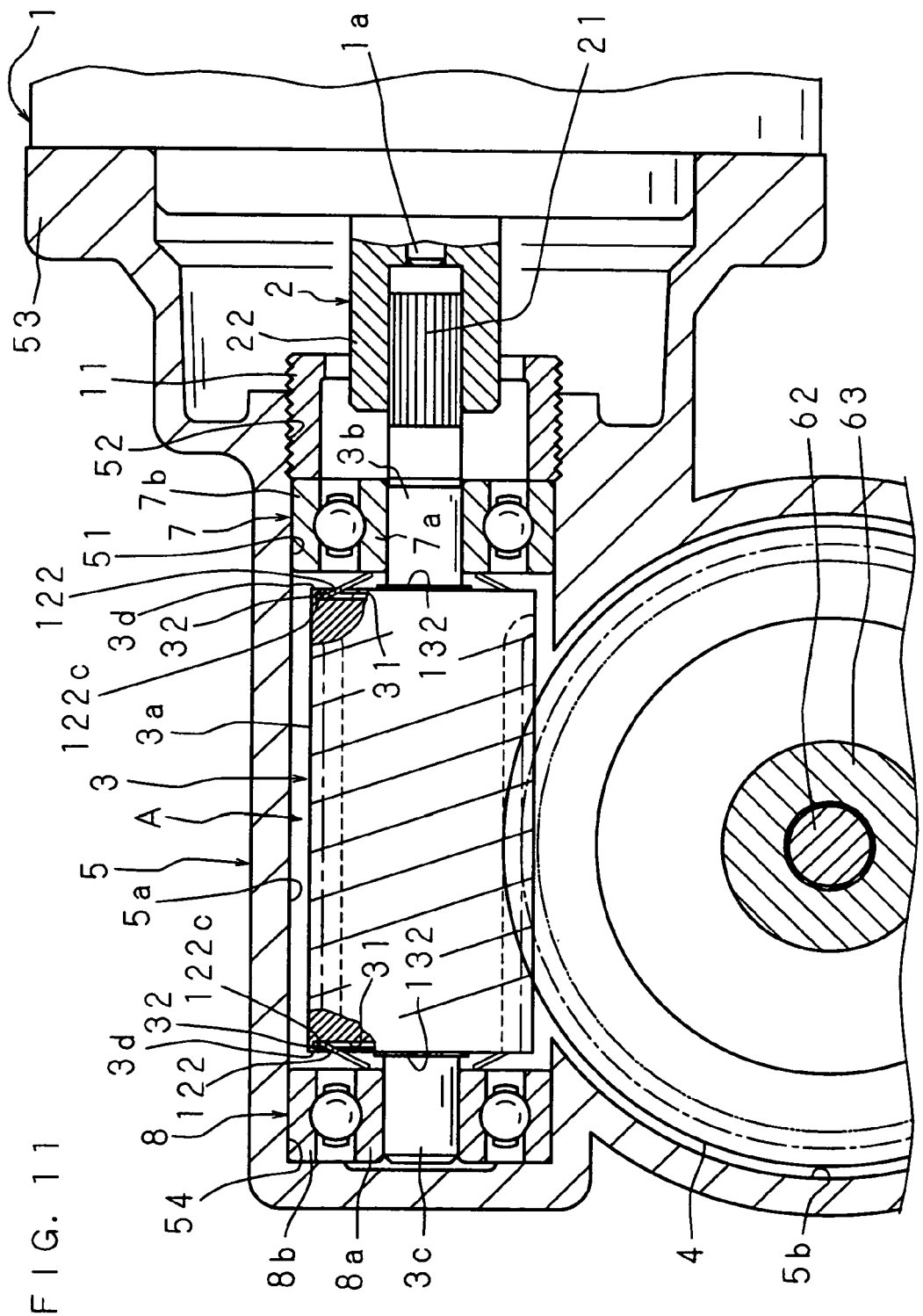
FIG. 11 is a schematic enlarged sectional view of a reduction gear mechanism portion, showing the configuration of Embodiment 5 of the electric power steering device in accordance with the present invention.
Figure 12:
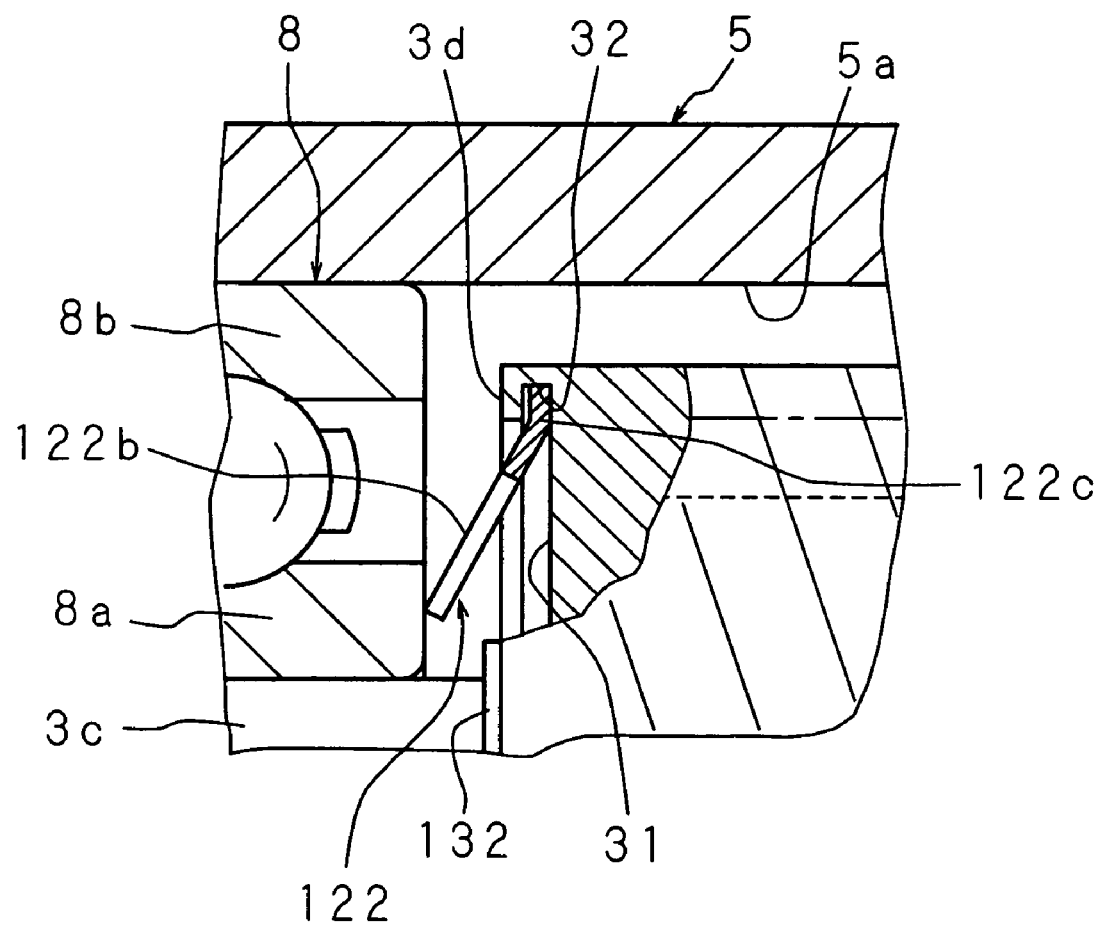
FIG. 12 is a schematic enlarged view of a portion on the side of one shaft portion of the worm of Embodiment 5.

FIG. 11 is a schematic enlarged sectional view of a reduction gear mechanism portion, showing the configuration of Embodiment 5 of the electric power steering device in accordance with the present invention, and FIG. 12 is a schematic enlarged view of a portion on the side of one shaft portion 3c of the worm 3 of Embodiment 5.

Instead of assembling both the belleville springs 122 and 122 in the inner rings 7a and 8a, respectively, as in the case of Embodiment 4, Embodiment 5 of the electric power steering device in accordance with the present invention is configured that the outer circumferential portions of the belleville springs 122 and 122 are assembled in both the step portions 3d and 3d of the worm 3, respectively, and that the inner circumferential portions thereof are made contact with the one side faces (the faces opposed to the sides of the gear body 3a of the worm 3) of the inner rings 7a and 8a.

In this Embodiment 5, circular concave portions 31 and 31 being dent in the axial direction are formed in the step portions 3d and 3d of both the shaft portions 3b and 3c, respectively. Hence, the end faces of both the shaft portions 3b and 3c are formed into a cylindrical shape. In addition, circular grooves 32 and 32 being dent outward are formed in the inner circumferential portions of the outer circumferential wall faces of the circular concave portions 31 and 31, respectively.

Furthermore, the belleville spring 122 is formed into a flexible taper shape inclined with respect to the center axis line from the fitting outer circumferential portion 122c, being flat and orthogonal to the center axis line, to the inner fringe. The portion on the side of the center axis away from the end portion of each fitting outer circumferential portion 122c is provided with an opening having a size capable of allowing the shaft portions 3b and 3c of the worm 3 to be inserted therethrough. Still further, the belleville spring 122 has multiple flexible pieces 122b protruding from the intermediate portion in the radial direction to the inner fringe. Moreover, the belleville springs 122 and 122 are installed so that the fitting outer circumferential portions 122c are internally fitted in the circular grooves 32 and 32 formed in the step portions 3d and 3d of both end portions of the worm 3 and so that the inner circumferential portions make contact with the one side faces of the inner rings 7a and 8a. Hence, the belleville springs 122 and 122 push the inner rings 7a and 8a of the roller bearings 7 and 8, respectively, in directions toward the gear body 3a of the worm 3. This eliminates the clearance between the inner rings 7a and 8a and the clearance between the outer rings 7b and 8b, in other words, the axial clearance between the roller bearings 7 and 8, and suppresses the movement of the worm 3, one way and the other way, in the axial direction with respect to the inner rings 7a and 8a.

Embodiments 4 and 5 described above have a configuration wherein the convex portions 132 and 132 serving as limiting members are formed so as to be integrated with the shaft portions 3b and 3c; however, in addition to this configuration, limiting members formed in a circular shape, for example, and serving as components separate from the shaft portions 3b and 3c, may be externally fitted on the shaft portions 3b and 3c. Furthermore, although the limiting members are formed so as to be continuous around the outer circumferences of both the shaft portions 3b and 3c, the limiting members may have one convex portion or multiple convex portions spaced in the circumferential directions of the shaft portions 3b and 3c. Moreover, the limiting members can also be configured, for example, that the portions between the adjacent flexible pieces 122b of the belleville spring 122 are deflected to the protruding side of the belleville spring 122 in parallel with the center axis line and that the bent portions are used as limiting members.

In addition, the belleville springs 122 and 122 of Embodiments 4 and 5 described above have a structure wherein the flexible pieces 122b are provided in the inner circumferential portion; however, in addition to this structure, the belleville springs 122 and 122 may have a structure wherein the flexible pieces 122b are provided in the outer circumferential portion. Furthermore, the belleville springs 122 and 122 may have a structure wherein the flexible pieces 122b are not provided.

In addition, the reduction gear mechanism A in accordance with Embodiments 4 and 5 described above may be a hypoid gear comprising a hypoid pinion serving as a small gear and a hypoid wheel serving as a large gear, instead of the worm gear comprising the worm 3 serving as a small gear and the worm wheel 4 serving as a large gear. Furthermore, the small gear and the large gear may be helical gears or may be gears obtained by combining part of a helical gear and part of a worm gear.

Next, Embodiments 6, 7 and 8 of the electric power steering device in accordance with the present invention will be described below.

Embodiment 6

Figure 13:
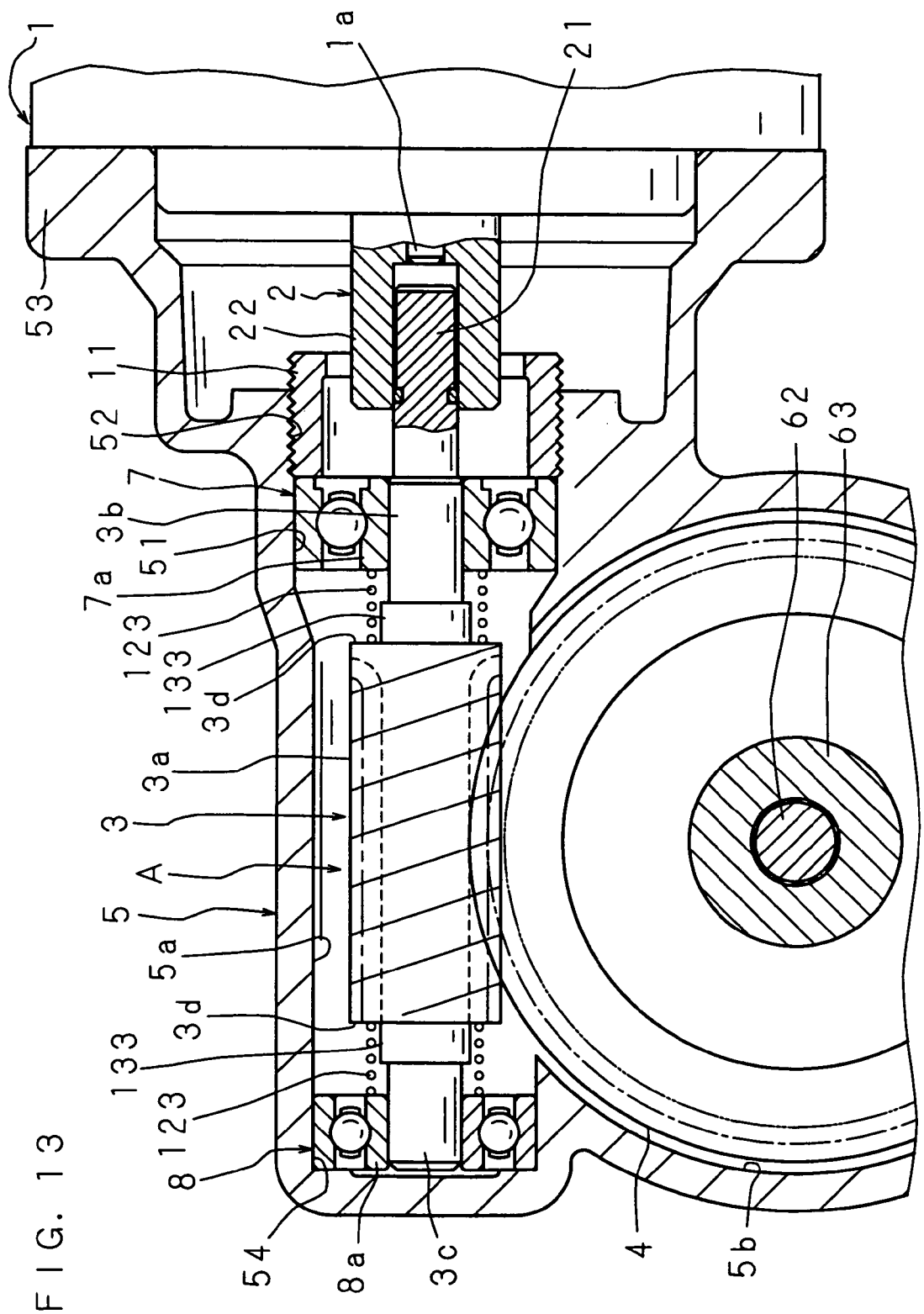
FIG. 13 is a schematic enlarged sectional view of a reduction gear mechanism portion, showing the configuration of Embodiment 6 of the electric power steering device in accordance with the present invention.

FIG. 13 is a schematic enlarged sectional view of a reduction gear mechanism portion, showing the configuration of Embodiment 6 of the electric power steering device in accordance with the present invention.

The worm 3 of the reduction gear mechanism A has a gear body 3a having a tooth portion with multi-arranged teeth and shaft portions 3b and 3c being smaller than the gear body 3a in diameter and connected to both end portions of the gear body 3a via step portions 3d and 3d formed in the radial direction. The one shaft portion 3b is internally fitted in the inner ring 7a of the roller bearing 7 so as to be movable in the axial direction, thereby being rotatably supported by the housing 5 via the roller bearing 7. The other shaft portion 3c is internally fitted in the inner ring 8a of the roller bearing 8 so as to be movable in the axial direction, thereby being rotatably supported by the housing 5 via the roller bearing 8. The worm wheel 4 is fitted on and secured to the intermediate portion of the second steering shaft 63.

Coil springs 123 and 123 serving as cylindrical elastic bodies for suppressing the movement of the worm 3 in the axial direction and convex portions 133 and 133 serving as limiting members for limiting the deflection amounts of the coil springs 123 and 123 are provided between the inner ring 7a of the bearing 7 and the step portion 3d on the side of the shaft portion 3b of the worm 3 and between the inner ring 8a of the bearing 8 and the step portion 3d on the side of the shaft portion 3c, respectively, the shaft portion 3b and the shaft portion 3c of the worm 3 being born by the roller bearings 7 and 8 so as to be movable in the axial direction.

The coil springs 123 and 123 are externally fitted over the shaft portions 3b and 3c between the inner rings 7a and 8a and the step portions 3d and 3d, the seats on one end portions thereof make contact with the one side faces of the inner rings 7a and 8a, respectively, and the seats on the other end portions thereof make contact with the step portions 3d and 3d, respectively. Hence, both the coil springs 123 and 123 can deflect by the distances between the inner rings 7a and 8a and the convex portions 3d and 3d; hence, the movement of the worm 3, one way and the other way, in the axial direction with respect to the inner rings 7a and 8a is suppressed.

The convex portions 133 and 133 protrude on the sides of the step portions 3d and 3d of both the shaft portions 3b and 3c of the worm 3 at portions inside the outer circumferential portions of the coil springs 123 and 123, in other words, protrude on the sides of the step portions 3d and 3d inside the outer circumferential portions of the coil springs 123 and 123 around the entire outer circumferences of the shaft portions 3b and 3c between the inner rings 7a and 8a and both the step portions 3d and 3d, respectively, so as to be integrated with the shaft portions 3b and 3c, respectively. In addition, the convex portions 133 and 133 are formed so as to be larger in diameter than the shaft portions 3b and 3c, but the diameters thereof are made smaller than the inside diameters of the coil springs 123 and 123. Hence, as the worm 3 moves in the axial direction, the convex portion 133 on the side of the one shaft portion 3b makes contact with the side face of the inner ring 7a of the roller bearing 7 on the side of the gear body 3a, or the convex portion 133 on the side of the other shaft portion 3c makes contact with the side face of the inner ring 8a of the roller bearing 8 on the side of the gear body 3a, thereby limiting the deflection amounts of the coil springs 123 and 123.

In Embodiment 6 of the electric power steering device in accordance with the present invention configured as described above, the shaft portion 3b on the one end portion side of the worm 3 is movably coupled to the output shaft 1a of the electric motor 1 via the shaft coupling 2, and the shaft portion 3b is born by the roller bearing 7 so as to be rotatable and movable in the axial direction, and the shaft portion 3c on the other end portion side is born by the roller bearing 8 so as to be rotatable and movable in the axial direction. Furthermore, the coil springs 123 and 123 are provided between the step portions 3d and 3d on both sides of the gear body 3a of the worm 3 and the inner rings 7a and 8a of the roller bearings 7 and 8, respectively. Furthermore, both the coil springs 123 and 123 act to suppress the movement of the worm 3 in the axial direction.

Hence, in the case where steering is performed in a steering range wherein the electric motor 1 is not driven, in other words, in a steering range wherein the steering angle of a vehicle running at high speed is a small angle of approximately one degree, for example, the steering force of the steering wheel B is transmitted to the worm 3 via the first steering shaft 61, the torsion bar 62, the second steering shaft 63 and the worm wheel 4. As a result, by the component force applied to the worm 3 in the axial direction, the worm 3 is moved, one way or the other way, in the axial direction while deflecting the one or the other coil spring 123. Hence, since the rotational angle of the worm 3 becomes small, the transmission from the worm 3 to the output shaft 1a of the electric motor 1 can be relieved; eventually, the steering load in the steering range wherein the electric motor 1 is not driven is reduced, and steering feeling is improved. Since the elastic restoration forces of the coil springs 123 and 123 in the deflection ranges are stable in comparison with the belleville springs, steering feeling is further improved.

Furthermore, in the case where the force applied to the worm 3 in the axial direction is relatively large in a steering range wherein the electric motor 1 is not driven, the deflection amount of the one coil spring 123 increases; however, the deflection amount of the coil spring 123 can be limited by the convex portions 133. For example, in the case where the worm 3 moves one way in the axial direction, the movement force of the worm 3 is transmitted from the one step portion 3d to the one coil spring 123; hence, the coil spring 123 is deflected. As the deflection amount of the coil spring 123 increases, the convex portion 133 makes contact with the one side face (the face opposed to the side of the gear body 3a of the worm 3) of the inner ring 7a or 8a; hence, the movement of the worm 3 can be limited. As a result, the deflection amount of the coil spring 123 is also limited; therefore, the plastic deformation of the coil spring 123 is prevented and the durability thereof is improved.

In addition, since the movement of the worm 3 in the axial direction is suppressed by the coil springs 123 and 123, the possibility of causing improper direction during assembly, as in the case of the belleville springs, is eliminated; hence, it is possible to eliminate the necessity of reassembling the coil springs 123 and 123. In addition, since the changes in the dimensions of the inside and outside diameters of the coil springs 123 and 123 are small in comparison with the belleville springs, such spring receiving members as those required for the belleville springs are not necessary; hence, the number of components can be reduced, and the coil springs 123 and 123 can be assembled without increasing the size of the portion of the worm 3. Furthermore, since the convex portions 133 and 133 are formed so as to be integrated with the shaft portions 3*b* and 3*c*, the limiting members can be provided without increasing the number of components; hence, the assembly workability is improved, and the cost is reduced although the limiting members are provided.

Embodiment 7

Figure 14:
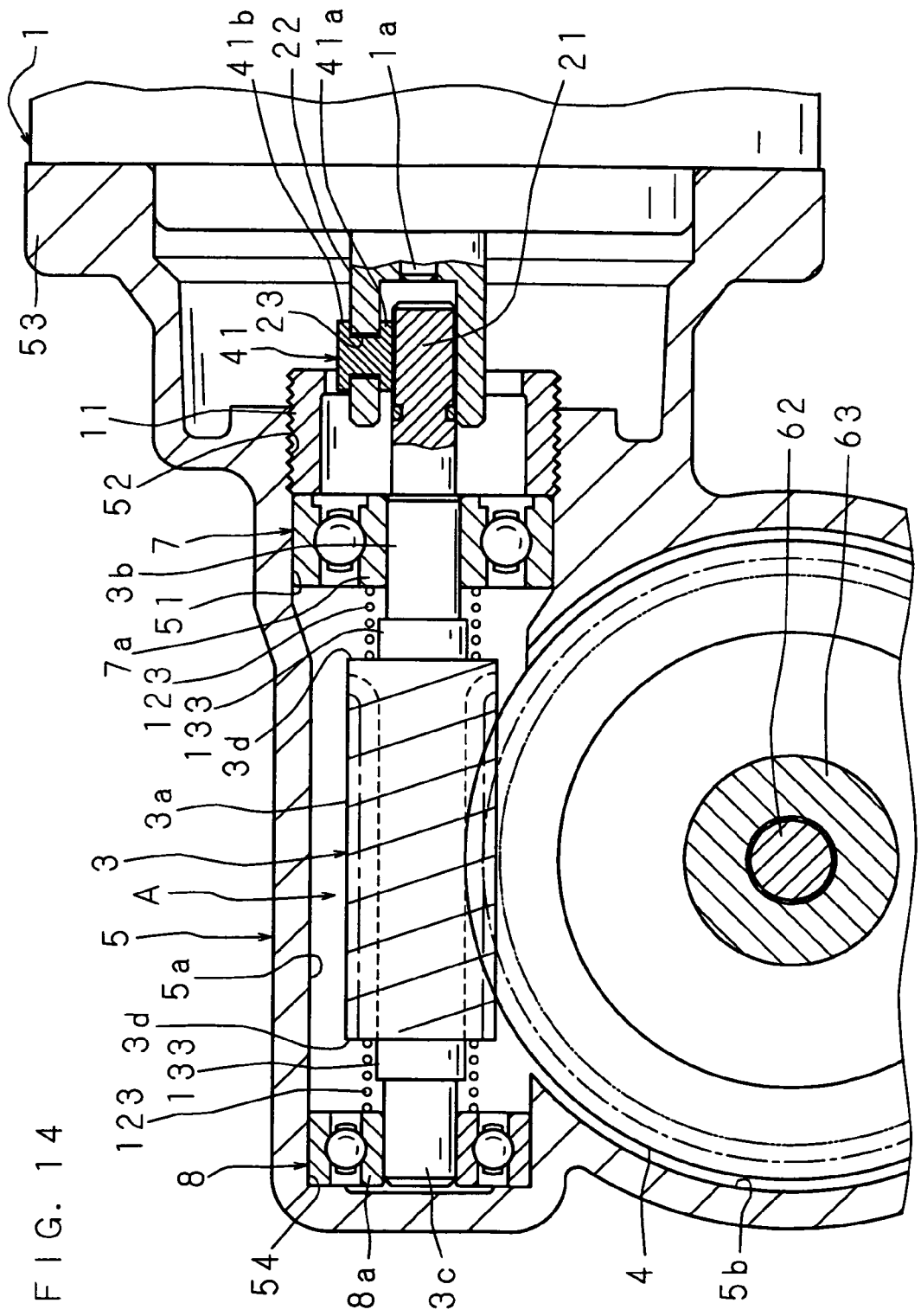
FIG. 14 is a schematic enlarged sectional view of a reduction gear mechanism portion, showing the configuration of Embodiment 7 of the electric power steering device in accordance with the present invention.

FIG. 14 is a schematic enlarged sectional view of a reduction gear mechanism portion, showing the configuration of Embodiment 7 of the electric power steering device in accordance with the present invention.

As in the case of Embodiments described above, in Embodiment 7 of the electric power steering device in accordance with the present invention, being configured that the shaft portion 3*b* of the worm 3 is movably coupled to the output shaft 1*a*, a through hole 23 passing through in the radial direction is formed in part of the female joint portion 22 into which the male joint portion 21 is inserted, and a pushing member 41 having flexibility is inserted into the through hole 23 so as to be held therein. With this configuration, the pushing member 41 pushes the male joint portion 21 in the radial direction, thereby reducing the wobble of the male joint portion 21 with respect to the female joint portion 22 in the radial and circumferential directions.

More specifically, the pushing member 41 is formed of a short shaft member having flanges 41*a* and 41*b* on both end portions thereof and wholly made of a material having flexibility, such as rubber or synthetic resin. In addition, since the one flange 41*a* inserted from the through hole 23 into the female joint portion 22 pushes the male joint portion 21 in the radial direction, the gap between the male joint portion 21 and the female joint portion 22 is flanked on one side in the radial direction; furthermore, since the outer circumferential face of the female joint portion 22 is held between both the flanges 41*a* and 41*b*, the pushing member 41 is prevented from dropping from the through hole 23.

In this Embodiment 7, the male joint portion 21 is inserted into the female joint portion 22 while the pushing member 41 is inserted and held in the through hole 23 of the female joint portion 22, for example.

Since the configurations and actions of the other components are similar to those of Embodiment 6, similar components are designated by the same reference numerals, and the detailed descriptions of the components and the descriptions of their working effects are omitted.

Embodiment 8

Figure 15:
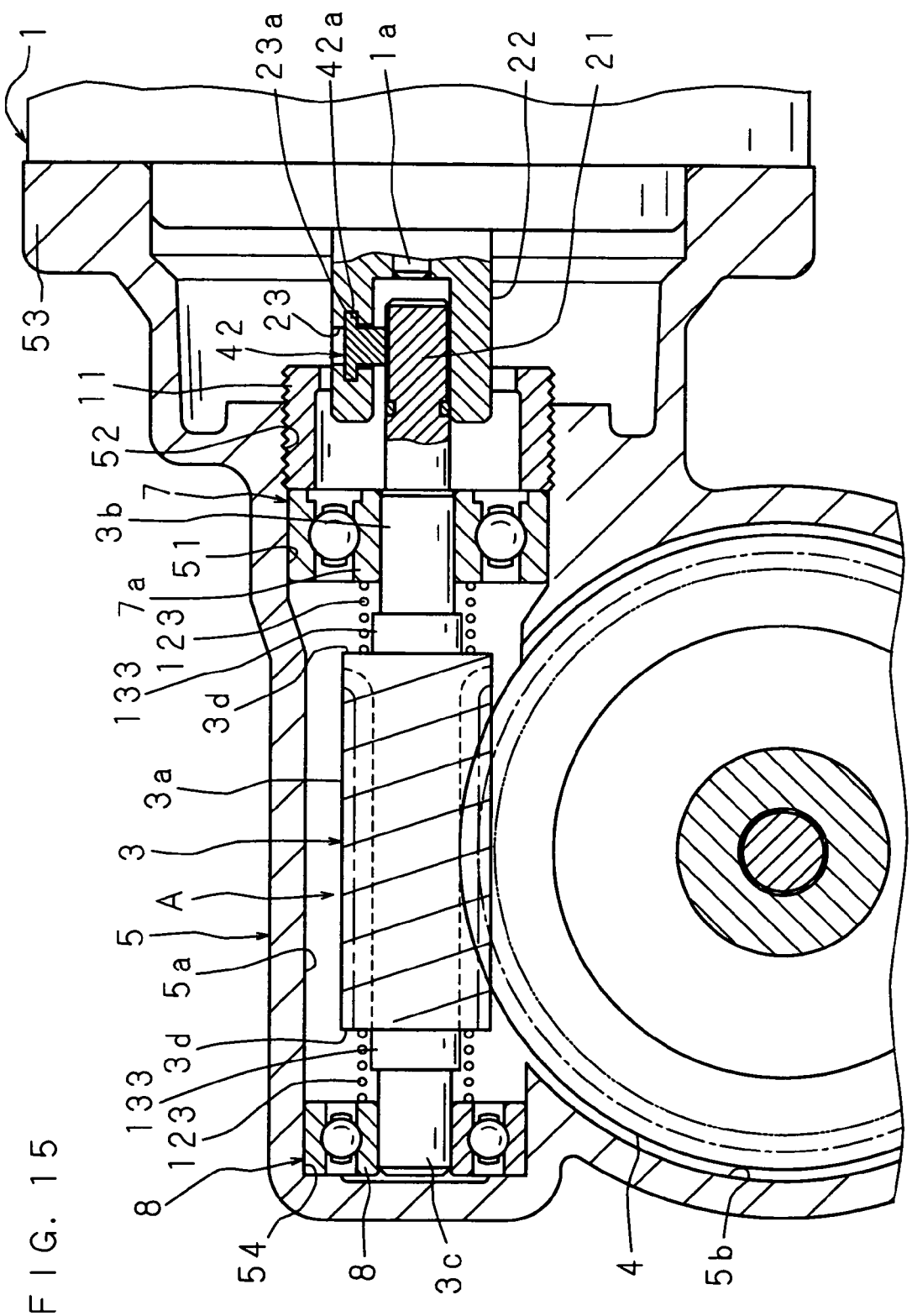
FIG. 15 is a schematic enlarged sectional view of a reduction gear mechanism portion, showing the configuration of Embodiment 8 of the electric power steering device in accordance with the present invention.

FIG. 15 is a schematic enlarged sectional view of a reduction gear mechanism portion, showing the configuration of Embodiment 8 of the electric power steering device in accordance with the present invention.

In Embodiment 8 of the electric power steering device in accordance with the present invention, instead of the pushing member 41 formed of a short shaft member having the flanges 41*a* and 41*b* on both end portions thereof in accordance with Embodiment 7 described above, a pushing member 42 having flexibility and formed of a short shaft member having a flange 42*a* only on one end portion thereof is inserted into a through hole 23 formed in the radial direction in part of the female joint portion 22 so as to be held therein. With this configuration, the pushing member 42 pushes the male joint portion 21 in the radial direction, thereby reducing the wobble of the male joint portion 21 with respect to the female joint portion 22 in the radial and circumferential directions.

More specifically, the through hole 23 has a circular groove 23*a* at an intermediate position in the direction of the depth thereof on a plane in parallel with the axial direction, and the flange 42*a* is inserted into this circular groove 23*a*; hence, the pushing member 42 is prevented from dropping from the through hole 23.

Since the configurations and actions of the other components are similar to those of Embodiments 6 and 7, similar components are designated by the same reference numerals, and the detailed descriptions of the components and the descriptions of their working effects are omitted.

Embodiments 6, 7 and 8 described above have a configuration wherein the convex portions 133 and 133 serving as limiting members are provided so as to be integrated with the shaft portions 3*b* and 3*c*; however, in addition to this configuration, limiting members formed into a circular shape, for example, separate from the shaft portions 3*b* and 3*c*, may be externally fitted on the shaft portions 3*b* and 3*c*. Furthermore, the limiting members may be structured so as to be continuous around the entire outer circumferences of the shaft portions 3*b* and 3*c*; still further, the limiting members may have one convex portion or multiple convex portions spaced and arranged in the circumferential directions of the shaft portions 3*b* and 3*c*.

Moreover, although the coil spring 123 is used as a cylindrical elastic body in Embodiments 6, 7 and 8 described above, the cylindrical elastic body may be a rubber pipe, a bellows or the like having flexibility, and its configuration is not limited particularly.

In addition, the reduction gear mechanism A in accordance with Embodiments 6, 7 and 8 described above may be a hypoid gear comprising a hypoid pinion serving as a small gear and a hypoid wheel serving as a large gear, instead of the worm gear comprising the worm 3 serving as a small gear and the worm wheel 4 serving as a large gear. Furthermore, the small gear and the large gear may be helical gears or may be gears obtained by combining part of a helical gear and part of a worm gear.

INDUSTRIAL APPLICABILITY

As detailed above, with the first invention of the electric power steering device in accordance with the present invention, the limiting members for limiting the deflection amounts of the circular elastic bodies can be provided at portions along the outer circumferences of the above-mentioned shaft portions respectively at both end portions of the gear body without increasing the size of the small gear portion; hence, it is not necessary to increase the size of the worm serving as the small gear.

Furthermore, in addition to the first invention, with the second invention of the electric power steering device in accordance with the present invention, the deflection amounts of the circular elastic bodies can be limited by the limiting members; hence, the plastic deformation of the circular elastic bodies can be prevented and the durability thereof can be improved.

Moreover, in addition to the second invention, with the third invention of the electric power steering device in accordance with the present invention, the stability of the belleville springs can be raised without using support members for supporting the flexible pieces of the belleville springs. Hence, the number of components can be reduced although the belleville springs are provided, and the cost can be reduced in comparison with the case wherein the supporting members are used. Besides, since positioning means for determining the circumferential positions of the belleville springs are not necessary, the number of man-hours required for working and the number of man-hours required for assembly can be reduced in comparison with the case wherein such positioning means are provided, and the cost is further reduced.

Still further, in addition to the first invention, with the fourth invention of the electric power steering device in accordance with the present invention, steering feeling in the case where steering is performed left or right from the steering neutral position can be improved, and the durability of the elastic bodies for suppressing the movement of the small gear can be improved; furthermore, even in the case where the abrasion amounts of the teeth increase, the backlash amount at the meshing portion is reduced.

Still further, in addition to the fourth invention, with the fifth invention of the electric power steering device in accordance with the present invention, the structure for supporting the elastic bodies is simplified; hence, the machinability and assembly workability are improved.

Still further, in addition to the first invention, with the sixth invention of the electric power steering device in accordance with the present invention, steering feeling in the case where steering is performed left or right from the steering neutral position can be improved, and the durability of the circular elastic bodies for suppressing the movement of the small gear can be improved; furthermore, the possibility of causing improper direction during the assembly of the elastic bodies is eliminated; hence, it is possible to eliminate the necessity of reassembling the elastic bodies.

Still further, in addition to the sixth invention, with the seventh invention of the electric power steering device in accordance with the present invention, the belleville springs are assembled easily, and the lengths of the shaft portions of the small gear in the axial direction can be shortened without suppressing the maximum deflection amounts of the belleville springs.

Still further, in addition to the first invention, with the eighth invention of the electric power steering device in accordance with the present invention, steering feeling in the case where steering is performed left or right from the steering neutral position can be improved, and the durability of the elastic bodies for suppressing the movement of the small gear can be improved; furthermore, the possibility of causing improper direction during the assembly of the elastic bodies is eliminated; hence, it is possible to eliminate the necessity of reassembling the elastic bodies.

Still further, in addition to the first invention, with the ninth invention of the electric power steering device in accordance with the present invention, steering feeling in the case where steering is performed left or right from the steering neutral position can be improved, and the durability of the cylindrical elastic bodies can be improved; furthermore, the possibility of causing improper direction that may occur in the case of the assembly of the belleville springs is eliminated; hence, it is possible to eliminate the necessity of reassembling the cylindrical elastic bodies; moreover, the number of components can be reduced, and the cylindrical elastic bodies can be provided without increasing the size of the small gear portion.

Still further, in addition to the ninth invention, with the tenth invention of the electric power steering device in accordance with the present invention, steering feeling can be improved further, and the limiting members can be provided without increasing the number of components; hence, the assembly workability is improved, and the cost is reduced although the limiting members are provided.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

The invention claimed is:
1. An electric power steering device comprising:
a small gear having a gear body which is rotated by an electric motor and on which a tooth portion is formed and shaft portions respectively formed so as to protrude from both end portions of said gear body and being smaller in diameter than said gear body;
bearings for respectively bearing both said shaft portions of said small gear so that said small gear can move in an axial direction;
two circular elastic bodies having flat portions formed on an inner circumferential side, and a tapered portion formed on an outer circumferential side connected to the flat portions, the elastic bodies being respectively externally fitted on both said shaft portions of said small gear, for suppressing movement of said small gear in the axial direction to shaft end portions; and
a large gear meshing with the tooth portion of said gear body of said small gear and connected to a steering means; and being configured to assist steering by rotation of said electric motor, comprising:
limiting members, arranged along outer circumferences of said shaft portions respectively at its both end portions of said gear body, for limiting deflection amounts of said elastic bodies,
wherein each elastic body is disposed adjacent to a respective one of the bearings and adjacent to a respective one of the limiting members,
wherein the bearings are roller bearings, and
wherein the circular elastic bodies are belleville springs with the flat portions at its end portions and multiple flexible pieces formed so as to protrude from the tapered portion to the inner circumferential side,
the limiting members being disposed between inner rings of the roller bearings and its both end portions of the gear body of the small gear, respectively, and
the inner rings of the roller bearings are configured so as to make contact with protruding side faces of the flat portions, and the limiting members are configured so as to make contact with rear faces of the protruding side faces.
2. The electric power steering device as set forth in claim 1, wherein
said bearings are configured so as to be movable in a direction wherein a distance between a rotational center of said small gear and a rotational center of said large gear becomes long or short, and
an energizing means for energizing said bearings in a direction wherein the distance between the rotational center of said small gear and the rotational center of said large gear becomes short is provided.

3. The electric power steering device as set forth in claim 2, wherein
said bearings are roller bearings, and
said circular elastic bodies are belleville springs disposed between inner rings of said roller bearings and end portions of said gear body of said small gear.

4. An electric power steering device comprising:
a small gear having a gear body rotated by an electric motor and on which a tooth portion is formed and shaft portions respectively formed so as to protrude from both end portions of the gear body and being smaller in diameter than the gear body;
roller bearings for respectively bearing both the shaft portions of the small gear so that the small gear can move in an axial direction;
two circular elastic bodies installed in inner rings of the roller bearings, respectively externally fitted on both the shaft portions of the small gear, for suppressing movement of the small gear in the axial direction to shaft end portions; and
a large gear meshing with the tooth portion of the gear body of the small gear and connected to a steering means; and being configured to assist steering by rotation of the electric motor, comprising:
limiting members, arranged along outer circumferences of the shaft portions respectively at its both end portions of the gear body, for limiting deflection amounts of the elastic bodies,
wherein each elastic body is disposed adjacent to a respective one of the roller bearings and adjacent to a respective one of the limiting members,
wherein circular grooves are formed on outer circumferential faces of the inner rings of the roller bearings between raceway grooves and side faces on sides of the gear body of the small gear, and
wherein the circular elastic bodies are belleville springs whose inner circumferential portions are formed so as to be fitted in the circular grooves formed on the outer circumferential faces of the inner rings of the roller bearings.

5. An electric power steering device comprising:
a small gear having a gear body rotated by an electric motor and on which a tooth portion is formed and shaft portions respectively formed so as to protrude from both end portions of the gear body and being smaller in diameter than the gear body;
bearings for respectively bearing both the shaft portions of the small gear so that the small gear can move in an axial direction;
two circular elastic bodies, respectively externally fitted on both the shaft portions of the small gear, for suppressing movement of the small gear in the axial direction to shaft end portions; and
a large gear meshing with the tooth portion of the gear body of the small gear and connected to a steering means; and being configured to assist steering by rotation of the electric motor, comprising:
limiting members, arranged along outer circumferences of the shaft portions respectively at its both end portions of the gear body, for limiting deflection amounts of the elastic bodies,
wherein each elastic body is disposed adjacent to a respective one of the bearings and adjacent to a respective one of the limiting members, and
wherein the circular elastic bodies are belleville springs whose outer circumferential portions are formed so as to be fitted in circular grooves formed on inner circumferential faces of cylindrical concave portions formed at end portions of the small gear.

* * * * *